United States Patent
Ji

(10) Patent No.: US 12,367,149 B2
(45) Date of Patent: Jul. 22, 2025

(54) STORAGE DEVICE PREDICTING ACCESS AND REPRODUCING DATA

(71) Applicant: SAMSUNG ELECTRONICS CO., LTD., Suwon-si (KR)

(72) Inventor: Sooyoung Ji, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/367,584

(22) Filed: Sep. 13, 2023

(65) Prior Publication Data

US 2024/0176743 A1 May 30, 2024

(30) Foreign Application Priority Data

Nov. 25, 2022 (KR) .................... 10-2022-0160589

(51) Int. Cl.
  *G06F 12/0862* (2016.01)
  *G06F 12/02* (2006.01)

(52) U.S. Cl.
  CPC ...... *G06F 12/0862* (2013.01); *G06F 12/0215* (2013.01); *G06F 2212/171* (2013.01); *G06F 2212/2022* (2013.01)

(58) Field of Classification Search
  CPC ............ G06F 12/0862; G06F 12/0215; G06F 2212/171; G06F 2212/2022
  See application file for complete search history.

(56) References Cited

U.S. PATENT DOCUMENTS

| | | | |
|---|---|---|---|
| 7,679,133 B2 | 3/2010 | Son et al. | |
| 8,069,324 B2 | 11/2011 | Moon et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 9,244,832 B1* | 1/2016 | Sherman | G06F 12/0246 |
| 9,542,199 B2 | 1/2017 | Heo et al. | |
| 10,061,521 B2 | 8/2018 | Yun et al. | |
| 10,896,136 B2 | 1/2021 | Bae et al. | |
| 10,997,080 B1 | 5/2021 | Eliash et al. | |
| 11,327,883 B2 | 5/2022 | Huang et al. | |

(Continued)

FOREIGN PATENT DOCUMENTS

| | | |
|---|---|---|
| KR | 10-1522402 B1 | 5/2015 |
| KR | 10-2020-0030325 A | 3/2020 |

*Primary Examiner* — Prasith Thammavong
(74) *Attorney, Agent, or Firm* — Muir Patent Law, PLLC

(57) ABSTRACT

A storage device comprising a nonvolatile memory device, and a storage controller configured to control the nonvolatile memory device wherein the storage controller is configured to, detect a logical address pattern repeatedly requested by a host, divide the logical address pattern into input logical addresses and predictive logical addresses, and generate a reproduction model for generating reproduction data corresponding to the predictive logical addresses in the data pattern when the predictive logical addresses are input using machine learning, and in response to a read request for the input logical addresses from the host, predict the predictive logical addresses using the input logical addresses, generate the reproduction data by inputting the predictive logical addresses into the reproduction model, and prefetch the generated reproduction data to a buffer memory included in the storage controller.

20 Claims, 29 Drawing Sheets

(56) References Cited

U.S. PATENT DOCUMENTS

| | | | |
|---|---|---|---|
| 11,621,808 B1* | 4/2023 | Jiao | H04L 1/203 |
| | | | 706/21 |
| 2011/0233648 A1 | 9/2011 | Seol | |
| 2019/0129834 A1* | 5/2019 | Purkayastha | G06N 20/00 |
| 2019/0258585 A1 | 8/2019 | Marcu et al. | |
| 2019/0317901 A1* | 10/2019 | Kachare | G06F 3/064 |
| 2020/0285386 A1* | 9/2020 | Nelogal | G06F 7/582 |
| 2020/0334286 A1* | 10/2020 | Hwang | G06F 18/24 |
| 2020/0341899 A1* | 10/2020 | Dias | G06N 20/00 |
| 2021/0096777 A1 | 4/2021 | Jiang et al. | |

\* cited by examiner

| | LOGICAL ADDRESS PATTERN | | | | |
|---|---|---|---|---|---|
| INPUT LOGICAL ADDRESS | | | | PREDICTIVE LOGICAL ADDRESS | |
| LBA1 | LBA2 | LBA3 | LBA4 | LBA5 | LBA6 |
| DATA1 | DATA2 | DATA3 | DATA4 | DATA5 | DATA6 |
| READ DATA | | | | REPRODUCTION DATA | |
| DATA PATTERN | | | | | |

FIG. 3A

| | CANDIDATE LOGICAL ADDRESS PATTERN LIST | 313 |
|---|---|---|
| INDEX | LOGICAL ADDRESS PATTERN | NUMBER OF REQUESTS |
| 1 | LBA91-LBA120 | 1 |
| 2 | | |
| ... | | |
| N | | |

LBA91-LBA120 → (points to index 1)

CANDIDATE LOGICAL
ADDRESS PATTERN LIST

| INDEX | LOGICAL ADDRESS PATTERN | NUMBER OF REQUESTS |
|---|---|---|
| 1 | LBA101-LBA120 | 2 |
| 2 | LBA1-LBA50 | 1 |
| ... | | |
| N | | |

LBA101-LBA130 →

FIG. 4C

| | CANDIDATE LOGICAL ADDRESS PATTERN LIST | 314 |
|---|---|---|
| INDEX | INPUT LOGICAL ADDRESS | PREDICTIVE LOGICAL ADDRESS |
| 1 | LBA101-LBA106 | LBA107-LBA110 |
| 2 | | |
| ... | | |
| M | | |

LEARNED DATA PATTERN LIST

| INDEX | READ DATA |
|---|---|
| 1 | DATA1, DATA2, DATA3, DATA4 |
| 2 | |
| ... | |
| K | |

FIG. 11

STORAGE DEVICE PREDICTING ACCESS AND REPRODUCING DATA

CROSS-REFERENCE TO RELATED APPLICATION(S)

Korean Patent Application No. 10-2022-0160589, filed on Nov. 25, 2022, in the Korean Intellectual Property Office, is incorporated herein by reference in its entirety.

BACKGROUND

1. Field

A storage device is disclosed.

2. Description of the Related Art

Flash memory devices are widely used as voice and video data storage media for information devices such as computers, smartphones, PDAS, digital cameras, camcorders, voice recorders, MP3 players, and handheld computers.

SUMMARY

Embodiments are directed to a storage device including a nonvolatile memory device, and a storage controller configured to control the nonvolatile memory device, wherein the storage controller is configured to, detect a logical address pattern repeatedly requested by a host, divide the logical address pattern into input logical addresses and predictive logical addresses, and generate a reproduction model for generating reproduction data corresponding to the predictive logical addresses in the data pattern when the predictive logical addresses are input using machine learning, and in response to a read request for the input logical addresses from the host, predict the predictive logical addresses using the input logical addresses, generate the reproduction data by inputting the predictive logical addresses into the reproduction model, and prefetch the generated reproduction data to a buffer memory included in the storage controller.

Embodiments are directed to a storage device including a nonvolatile memory device, and a storage controller configured to control the nonvolatile memory device, wherein the storage controller is configured to, detect a data pattern repeatedly requested by a host, determine input data and reproduction data in the data pattern, generate a reproduction model for generating the reproduction data when the input data is input using machine learning, and store the input data in a learned data pattern list, and in response to a read request for the input data from the host, obtain input data from the nonvolatile memory device, generate the reproduction data by inputting the obtained input data into the reproduction model, and prefetch the generated reproduction data to a buffer memory included in the storage controller.

Embodiments are directed to a storage device including a nonvolatile memory device, and a storage controller configured to control the nonvolatile memory device, wherein the storage controller is configured to, detect a data pattern repeatedly requested by a host, determine input data and reproduction data in the data pattern, and generate a reproduction model for generating the reproduction data when the input data is input using machine learning, and obtain data corresponding to logical addresses from the nonvolatile memory device in response to a read request for the logical addresses from the host, generate the reproduction data by inputting the input data into the reproduction model when the obtained data includes the input data, divide the logical addresses into input logical addresses corresponding to the input data and predictive logical addresses corresponding to the reproduction data when the obtained data further includes the reproduction data, update the input logical addresses and the predictive logical addresses in a logical address pattern list, and invalidate reproduction data corresponding to the predictive logical addresses among data stored in the nonvolatile memory device.

BRIEF DESCRIPTION OF DRAWINGS

Features will become apparent to those of skill in the art by describing in detail exemplary embodiments with reference to the attached drawings in which:

FIGS. 3A and 3B are diagrams of a method of generating a reproduction model according to an example embodiment.

FIGS. 4A to 4D are diagrams of a method of detecting a frequently requested logical address pattern according to an example embodiment.

FIG. 5 is a diagram of a learned logical address pattern list according to an example embodiment.

FIG. 11 is a diagram of a learned data pattern list according to an example embodiment.

DETAILED DESCRIPTION

Figure 1:
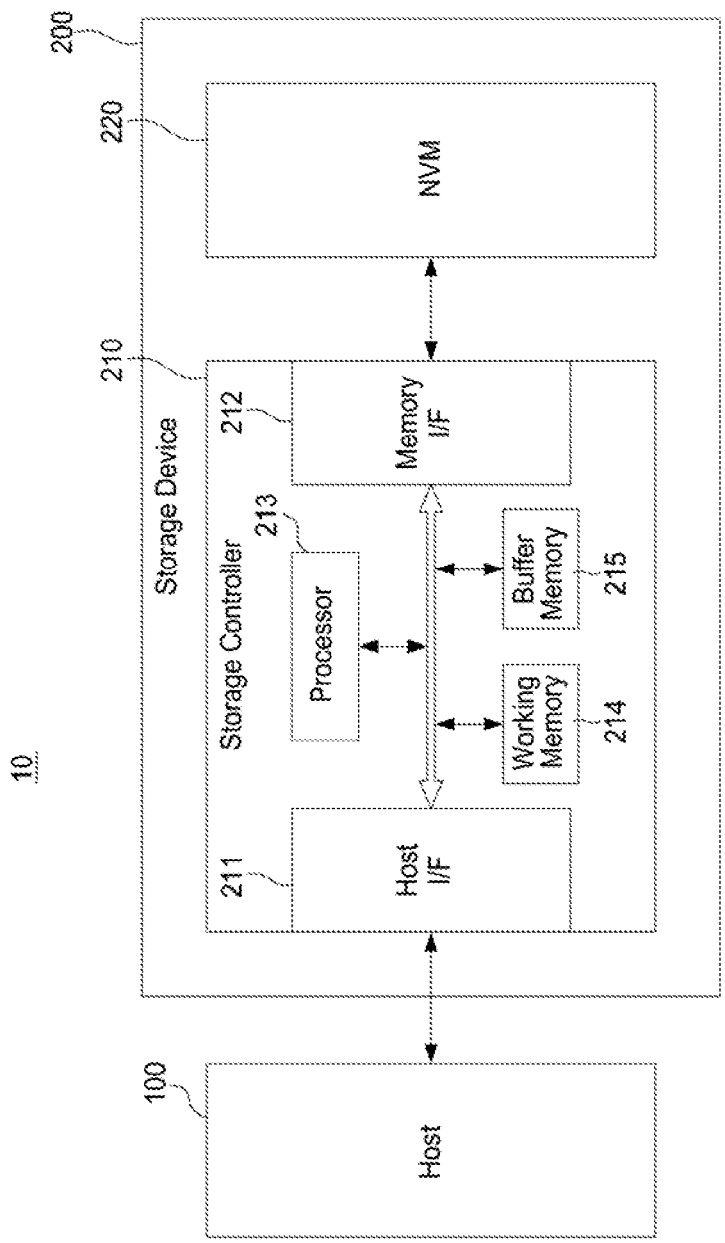
FIG. 1 is a schematic diagram showing an electronic system according to an example embodiment.

FIG. 1 is a schematic diagram of an electronic system according to an example embodiment. An electronic system 10 may include a host 100 and a storage device 200. In addition, the storage device 200 may include a storage controller 210 and a nonvolatile memory device 220.

The host 100 may include electronic devices, e.g., portable electronic devices such as mobile phones, MP3 players or laptop computers, or electronic devices such as desktop computers, game consoles, TVs or projectors. The host 100 may include at least one operating system (OS). The operating system may generally manage and control functions and operations of the host 100. As used herein, the term "or" is not an exclusive term, e.g., "A or B" would include A, B, or A and B.

The storage device 200 may include storage media for storing data according to a request from the host 100. In an implementation, the storage device 200 may include at least one of a solid state drive (SSD), an embedded memory, or a removable external memory. When the storage device 200 is the SSD, the storage device 200 may be a device that complies with a non-volatile memory express (NVMe) standard. When the storage device 200 is the embedded memory or the external memory, the storage device 200 may be a device that complies with the universal flash storage (UFS) or embedded multi-media card (eMMC) standard. The host 100 and the storage device 200 may generate and transmit packets according to adopted standard protocols, respectively.

The nonvolatile memory device 220 may maintain stored data even when power is not supplied. The nonvolatile memory device 220 may store data supplied from the host 100 through a program operation, and may output data stored in the nonvolatile memory device 220 through a read operation. The nonvolatile memory device 220 may include a plurality of nonvolatile memories NVMs. The nonvolatile memories NVMs may include a plurality of memory blocks. Each of the memory blocks may include a plurality of pages including a plurality of memory cells. The memory cells may be programmed or read in a page unit, and may be erased in a memory block unit.

When the nonvolatile memory device 220 includes a flash memory, the flash memory may include a 2D NAND memory or a 3D (vertical) NAND (VNAND) memory. In an implementation, the storage device 200 may be equipped with magnetic RAM (MRAM), spin-transfer torque MRAM, conductive bridging RAM (CBRAM), ferroelectric RAM (FeRAM), phase RAM (PRAM), or resistive RAM.

The storage controller 210 may control the nonvolatile memory device 220 in response to a request from the host 100. In an implementation, the storage controller 210 may provide data read from the nonvolatile memory device 220 to the host 100 and store the data provided from the host 100 in the nonvolatile memory device 220. For such an operation, the storage controller 210 may control operations such as a read operation, a program operation, or an erase operation of the nonvolatile memory device 220.

The storage controller 210 may include a host interface 211, a memory interface 212, a processor 213, a working memory 214, and a buffer memory 215.

The host interface 211 may transmit or receive packets to or from the host 100. Packets transmitted from the host 100 to the host interface 211 may include a request or data recorded in the nonvolatile memory device 220, and packets transmitted from the host interface 211 to the host 100 may include a response to a command or data read from the nonvolatile memory device 220.

The memory interface 212 may transmit the data recorded in the nonvolatile memory device 220 to the nonvolatile memory device 220 or receive data read from the nonvolatile memory device 220. The memory interface 212 may be implemented to comply with standard conventions such as toggle or an open NAND flash interface (ONFI).

The processor 213 may control overall operations of the storage device 200 by executing firmware or software. The working memory 214 may load firmware and software executed by the processor 213.

The buffer memory 215 may temporarily store the data recorded in the nonvolatile memory device 220 or the data read from the nonvolatile memory device 220. The buffer memory 215 may be provided in the storage controller 210, but may be disposed outside of the storage controller 210.

The working memory 214 and the buffer memory 215 may be implemented as volatile memories. In an implementation, the working memory 214 and the buffer memory 215 may be implemented as a static random access memory (SRAM) or a dynamic random access memory (DRAM). Working memory 214 and buffer memory 215 may be volatile memories, or non-volatile memories.

Meanwhile, in the storage device 200, some data may be requested more frequently than other data, but may not be changed frequently. In an implementation, when the storage device 200 is included in a web server, the host 100 may frequently request image files displayed on the main page of the website, but the image files may not be changed frequently.

It may take some time before data stored in the nonvolatile memory device 220 is loaded into the buffer memory 215 of the storage controller 210. There may be physical limitations to improving a read operation speed of the nonvolatile memory device 220 and the speed of transmitting data read from the nonvolatile memory device 220 to the storage controller 210. Accordingly, when all data is loaded from the nonvolatile memory device 220 in response to a request from the host, a response time to the request from the host 100 may take a long time.

In order to improve the response time, a method in which the storage device 200 caches frequently requested data to the buffer memory 215 and outputs the data from the buffer memory 215 when the host 100 requests the data may be considered. However, since the capacity of the buffer memory 215 may be limited, it may be difficult to cache all frequently requested data to the buffer memory 215.

The storage controller 210 may detect a frequently requested data pattern and generate a reproduction model that may reproduce at least a portion of the data pattern using machine learning. The reproduction model may generate partial data when logical addresses corresponding to the data pattern are input, or may generate the partial data when the remaining data of the data pattern is input.

The storage controller 210 may generate a portion of frequently requested data using the reproduction model and load only the remaining data from the nonvolatile memory device 220. When the amount of data loaded from the nonvolatile memory device 220 is reduced, the time taken for the storage controller 210 to load data from the nonvolatile memory device 220 may be reduced. Accordingly, the response time to a request from the host 100 may be improved.

Since the storage controller 210 may generate partial data using the reproduction model, the partial data may be removed from the nonvolatile memory device 220. The storage controller 210 may use the storage space of the nonvolatile memory device 220 more efficiently by removing the partial data from the nonvolatile memory device 220.

Hereinafter, a storage device according to a first example embodiment of the present disclosure will be described in more detail with reference to FIGS. 2 to 8.

Figure 2:
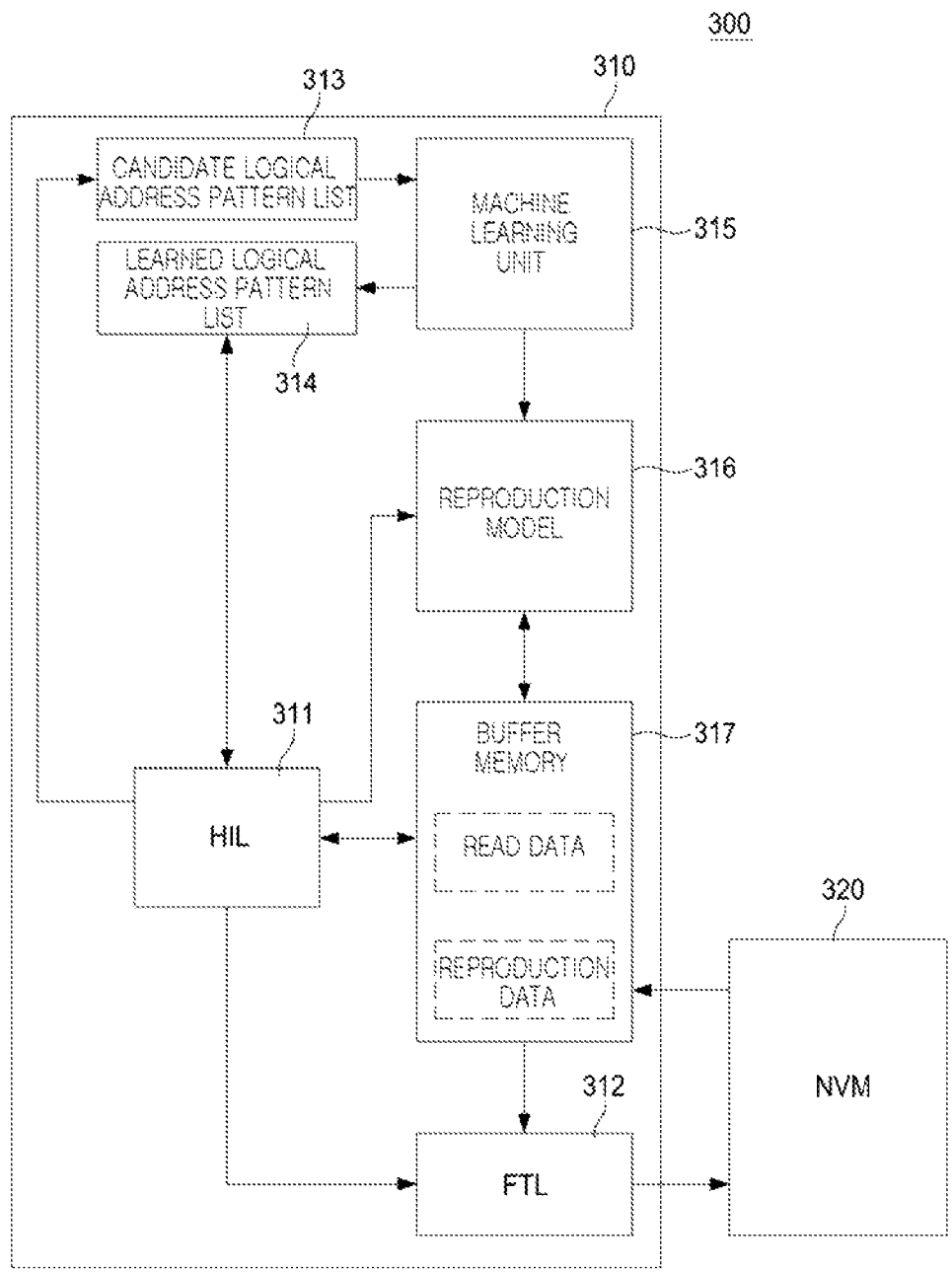
FIG. 2 is a diagram of a storage device according to an example embodiment.

FIG. 2 is a diagram of a storage device according to an example embodiment. Referring to FIG. 2, a storage device 300 may include a storage controller 310 and a nonvolatile memory device 320. The storage device 300, the storage controller 310, and the nonvolatile memory device 320 of FIG. 2 may correspond to the storage device 200, the storage controller 210, and the nonvolatile memory device 220 of FIG. 1, respectively.

The storage controller 310 may include a host interface layer 311 (HIL), a flash translation layer 312, a candidate logical address pattern list 313, a learned logical address pattern list 314, a machine learning unit 315, a reproduction model 316, and a buffer memory 317. The HIL 311, the FTL 312, the machine learning unit 315, and the reproduction model 316 may be loaded into the working memory of the storage controller 310 and executed in the processor. The candidate logical address pattern list 313 and the learned logical address pattern list 314 may also be loaded into the working memory of the storage controller 310.

The HIL 311 may control a host interface of the storage controller 310. The HIL 311 may receive a request from the host and transmit the received request to the FTL 312. In addition, the HIL 311 may control data input/output between the buffer memory 317 and the host.

The FTL 312 may perform an address mapping operation. The address mapping operation may be an operation of replacing a logical address received from a host with a physical address used to actually store data in the nonvolatile memory device 320. In an implementation, the FTL 312 may convert the logical address received along with a read request from the host into the physical address, and control the nonvolatile memory device 320 to access the physical address and perform a read operation.

The FTL 312 may further perform management operations such as a garbage collection operation as well as the address mapping operation. The garbage collection operation may be an operation to secure available capacity in the nonvolatile memory device 320 by copying effective data of a block to a new block and then erasing the existing block.

The candidate logical address pattern list 313 may detect a logical address pattern frequently requested from the host. In an implementation, the candidate logical address pattern list 313 may log logical addresses read from the host and determine logical addresses that may be read-requested at least a predetermined number of times among the logical addresses, as a candidate logical address pattern for machine learning. Then, the learned logical address pattern list 314 may store a logical address pattern in which machine learning is completed.

The machine learning unit 315 may generate the reproduction model 316 that may reproduce some data among a data pattern corresponding to the frequently requested logical address pattern by performing the machine learning. The reproduction model 316 may generate at least a portion of the data pattern using at least some logical addresses included in the logical address pattern as an input.

The buffer memory 317 may buffer data received from the host and provide the buffered data to the nonvolatile memory 320. In addition, the buffer memory 317 may buffer data read from the nonvolatile memory device 320 or data generated by the reproduction model 316, and may provide the buffered data to the host.

Hereinafter, a method of generating a reproduction model according to an example embodiment will be described in detail with reference to FIGS. 3A and 3B.

Figure 3B:
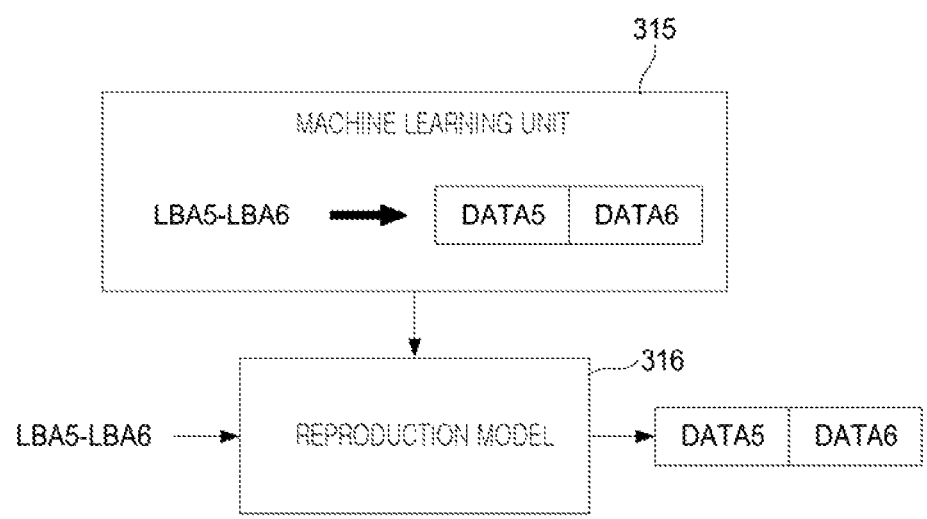

FIGS. 3A and 3B are diagrams of a method of generating a reproduction model according to an example embodiment.

FIG. 3A illustrates a structure of a logical address pattern and a data pattern that are subject to machine learning. The logical address pattern and the data pattern may correspond to each other. In an implementation, the logical address pattern may include first to sixth logical addresses LBA1 to LBA6. A data pattern requested by the first to sixth logical addresses LBA1 to LBA6 may be first to sixth data DATA1 to DATA6.

The data pattern may be integrally requested from the host. In an implementation, the data pattern may be data included in one file. The host may provide one read request for the logical address pattern to the storage device 300 so as to request the data pattern integrally, or may provide several read requests for different logical addresses.

The machine learning unit 315 may generate a reproduction model for generating some data among frequently requested data patterns. The storage controller 310 may generate some data from the data pattern using the reproduction model 316 and obtain only the remaining data from the nonvolatile memory device 320. Among the data patterns, data generated using the reproduction model 316 may be referred to as reproduction data, and data obtained from the nonvolatile memory device 320 may be referred to as read data. In an implementation, the first to fourth data DATA1 to DATA4 may be stored in the nonvolatile memory device 320. On the other hand, the fifth and sixth data DATA5 and DATA6 may not be stored in the nonvolatile memory device 320 and may be generated using the reproduction model 316.

In the logical address pattern, logical addresses corresponding to the read data may be referred to as input logical addresses, and logical addresses corresponding to the reproduction data may be referred to as predictive logical addresses. In an implementation, the first to fourth logical addresses LBA1 to LBA4 may be referred to as input logical addresses, and the fifth and sixth logical addresses LBA5 and LBA6 may be referred to as predictive logical addresses.

As described above, the logical address pattern may be integrally requested. Accordingly, when a read request for the input logical addresses is received by the storage controller 310, the storage controller 310 may predict that a read request for predictive logical addresses paired with the input logical addresses will be further received.

FIG. 3B illustrates a machine learning method according to an example embodiment. The machine learning unit 315 may perform machine learning using the predictive logical addresses and the reproduction data as training data. In an implementation, the machine learning may be supervised learning performed in a state in which both input data called the predictive logical addresses and result data called the reproduction data are given.

When the input logical addresses are input to the reproduction model 316, the machine learning unit 315 may repeatedly perform machine learning until the same data as the reproduction data is output from the reproduction model 316. The machine learning unit 315 may perform the machine learning when the storage device 300 is in an idle state.

The reproduction model 316 in which the machine learning is completed may generate the reproduction data using predictive logical addresses among logical addresses included in the logical address pattern. In an implementation, when the storage controller 310 receives the first to fourth logical addresses LBA1 to LBA4 regarded as input logical addresses, the fifth and sixth logical addresses LBA5 and LBA6 may be predicted as predictive logical addresses. In addition, the storage controller 310 may generate the reproduction data using the reproduction model 316 even before the predictive logical addresses are actually read-requested from the host.

Meanwhile, the size occupied by the reproduction data in the data pattern may be determined according to performance of the reproduction model 316. FIG. 3A illustrates a case in which the fifth and sixth data DATA5 and DATA6 of the data patterns DATA1 to DATA6 are determined as reproduction data.

Meanwhile, a logical address pattern frequently requested from the host may be selected as a machine learning target. Hereinafter, a method of detecting a frequently requested logical address pattern will be described in detail.

Figure 4B:
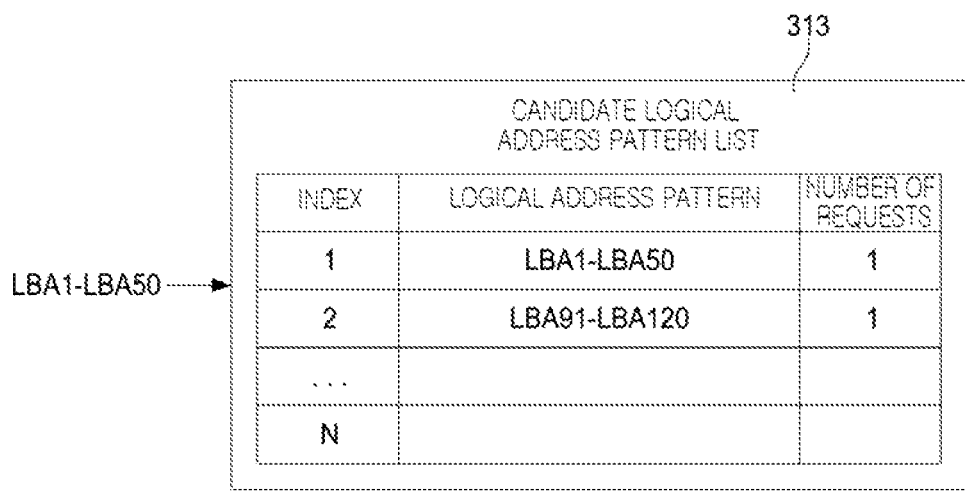

FIGS. 4A to 4D are diagrams of the method of detecting a frequently requested logical address pattern according to an example embodiment. The storage controller 310 may update logical addresses read-requested from the host in the candidate logical address pattern list 313, and may count the number of times the logical addresses are read-requested. Referring to FIG. 4A, the candidate logical address pattern list 313 may include N indexes (where N is a natural number) and may store N logical address patterns.

In the example of FIG. 4A, continuous logical addresses LBA91 to LBA120 may be received from the host. The logical addresses LBA91 to LBA120 received from the host may be inserted into a first index as a logical address pattern. The number of read requests of the logical address pattern inserted into the first index may be set to "1."

Meanwhile, the candidate logical address pattern list 313 may be loaded into the working memory. Since the capacity of the working memory may be limited, the number of logical address patterns that may be stored in the candidate logical address pattern list 313 may be limited. Accordingly, the logical address patterns stored in the candidate logical address pattern list 313 may be managed using a caching technique. In an implementation, the candidate logical address pattern list 313 may be managed using a least regularly used (LRU)-based caching technique.

Referring to FIG. 4B, continuous logical addresses LBA1 to LBA50 may be further received from the host. It may be determined whether at least a predetermined number of logical addresses in the existing logical address pattern stored in the candidate logical address pattern list 313 overlaps the logical addresses LBA1 to LBA50. If there is no existing logical address pattern overlapping the logical addresses LBA1 to LBA50 in the candidate logical address pattern list 313, the logical addresses LBA1 to LBA50 may be inserted into the first index, and the existing logical address patterns may be pushed to a next index.

Referring to FIG. 4C, continuous logical addresses LBA101 to LBA130 may be further received from the host. Among the existing logical address patterns, a portion of the logical address patterns LBA91 to LBA120 may overlap the received logical addresses LBA101 to LBA130. The logical addresses LBA101 to LBA120 in which the logical address patterns LBA91 to LBA120 and the received logical addresses LBA101 to LBA130 overlap each other may be determined.

Figure 4D:
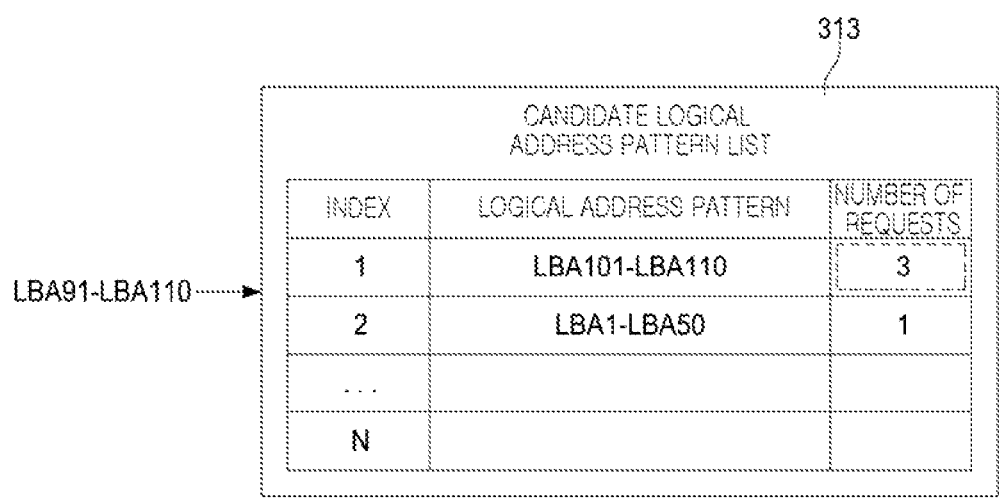

The existing logical address pattern LBA91 to LBA120 may be updated with the overlapped logical addresses LBA101 to LBA120, and the number of read requests may be updated to "2." Referring to FIG. 4D, continuous logical addresses LBA91 to LBA110 may be further received from the host. Among the existing logical address patterns, the logical address patterns LBA101 to LBA120 may overlap the logical addresses LBA91 to LBA110. The existing logical address pattern LBA101 to LBA120 may be updated with logical addresses LBA101 to LBA110 overlapping the received logical addresses LBA91 to LBA110, and the number of read requests may be updated to '3.'

The machine learning unit 315 may perform machine learning on a logical address pattern in which the number of read requests exceeds a predetermined threshold, among logical address patterns included in the candidate logical address pattern list 313. In an implementation, the machine learning unit 315 may divide the logical address pattern which is subject to the machine learning into input logical addresses and predictive logical addresses, and perform the machine learning so that reproduction data corresponding to the predictive logical addresses are generated when the predictive logical addresses are input in the reproduction model 316. The number of predictive logical addresses in the logical address pattern may be determined according to the performance of the processor executing the reproduction model 316. The logical address pattern in which the machine learning is completed by the machine learning unit 315 may be updated in the learned logical address pattern list 314.

FIG. 5 is a diagram of a learned logical address pattern list according to an example embodiment. The learned logical address pattern list 314 may include M indexes (where M is a natural number). The learned logical address pattern list 314 may divide and store the logical address pattern into the input logical address and the predictive logical address. In the embodiment of FIG. 5, the candidate logical address pattern may be divided into input logical addresses LBA101 to LBA106 and predictive logical addresses LBA107 to LBA110 and stored.

The storage controller 310 may receive logical addresses from the host, and may determine whether the logical addresses include input logical addresses by referring to the learned logical address pattern list 314. When the logical addresses are consistent with the input logical addresses, the storage controller 310 may predict the predictive logical addresses by referring to the learned logical address pattern list 314, and may generate the reproduction data by inputting the predictive logical addresses in the reproduction model 316.

When the read request for the input logical addresses is received, the storage controller 310 may generate the reproduction data corresponding to the predictive logical addresses using the reproduction model 316, and prefetch the generated reproduction data to the buffer memory 317. When the predictive logical addresses are received along with the read request, the storage controller 310 may provide the reproduction data to the host. The storage device 300 may rapidly respond to the read request from the host. In addition, since the reproduction data does not need to be stored in the nonvolatile memory device 320, the usage capacity of the nonvolatile memory device 320 may be saved.

Hereinafter, a method of operating a storage device according to an example embodiment of the present disclosure will be described with reference to FIGS. 6A to 7.

Figure 6A:
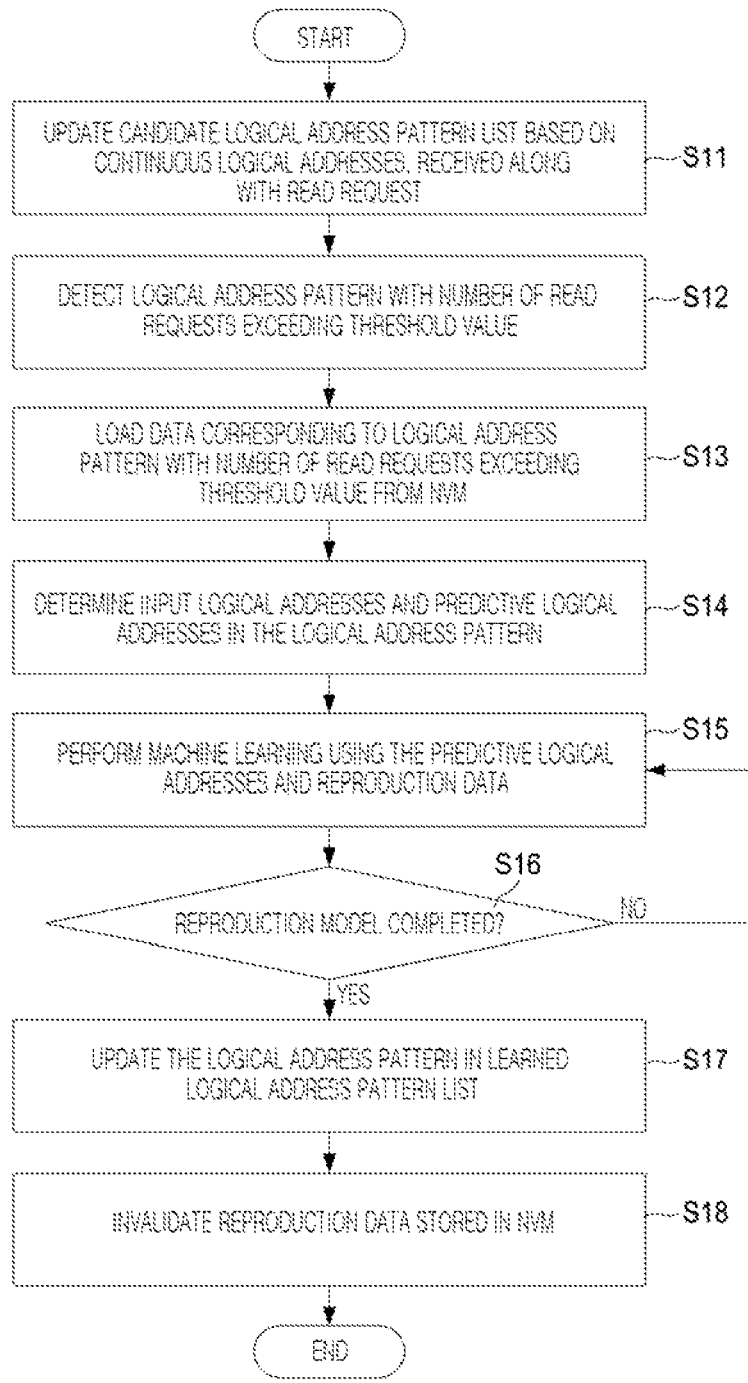
FIGS. 6A and 6B are flowcharts of a method of updating a learned logical address pattern list according to an example embodiment.
Figure 6B:
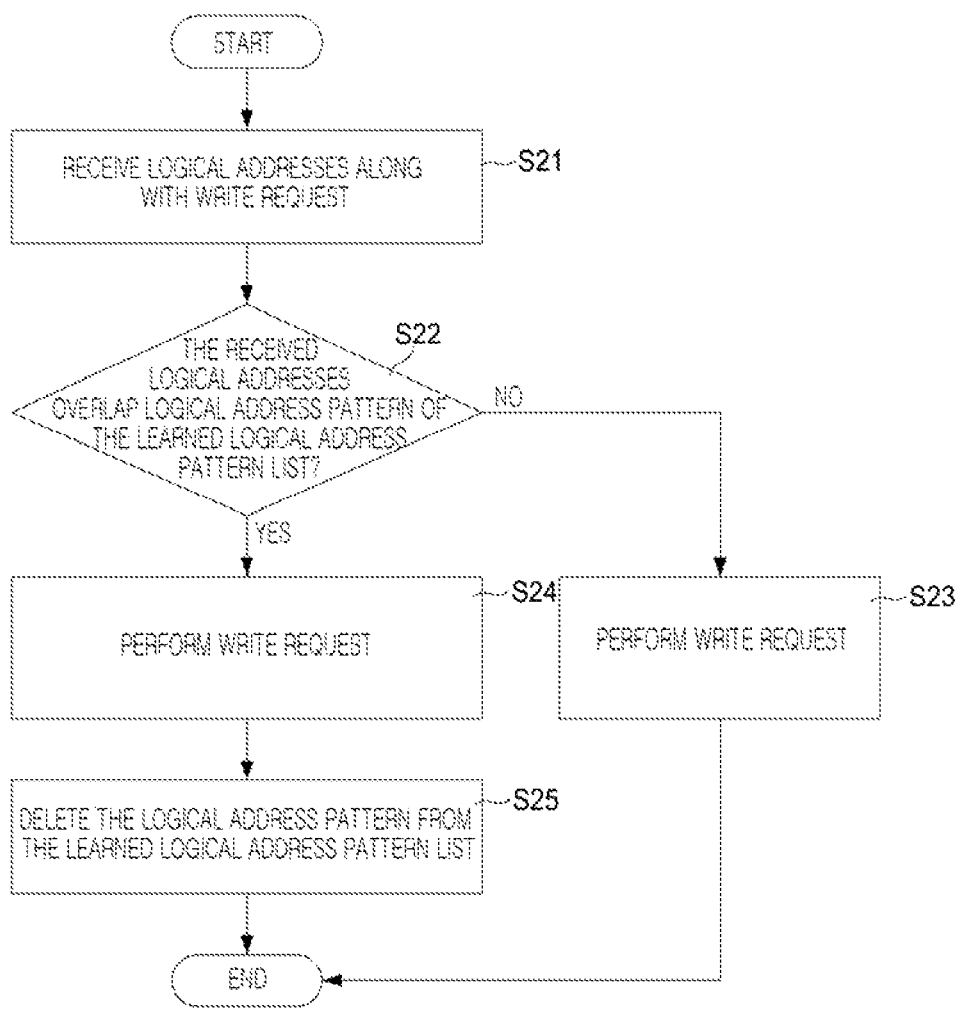

FIGS. 6A and 6B are flowcharts of a method of updating a learned logical address pattern list according to an example embodiment. FIG. 6A illustrates a method of updating a learned logical address pattern list in response to the read request from the host.

In operation S11, the storage controller 310 may update the candidate logical address pattern list 313 based on the continuous logical addresses, received along with the read request from the host. The method of updating the candidate logical address pattern list 313 has been described in detail with reference to FIGS. 4A to 4D.

In operation S12, the storage controller 310 may detect the logical address pattern in which the number of read requests exceeds a threshold value, among logical address patterns included in the candidate logical address pattern list 313.

In operation S13, the storage controller 310 may load the data pattern corresponding to the logical address pattern in which the number of read requests exceeds the threshold value, from the nonvolatile memory device 320.

In operation S14, the storage controller 310 may determine input logical addresses and predictive logical addresses in the logical address pattern. Each of the input logical addresses and the predictive logical addresses may include continuous logical addresses. Then, the predictive logical addresses may follow the input logical addresses.

In operation S15, the machine learning unit 315 of the storage controller 310 may perform machine learning using the predictive logical addresses and reproduction data corresponding to the predictive logical addresses in the data pattern so as to generate the reproduction model 316.

In operation S16, the machine learning unit 315 may determine whether the reproduction model 316 is completed. Completion of the reproduction model 316 may refer to outputting the same data as the reproduction data when the predicted logical addresses are input to the reproduction model 316.

When the reproduction model 316 is not completed ("No" in operation S16), the machine learning unit 315 may repeatedly perform the operation S15. When the reproduction model 316 is completed ("Yes" in operation S16), in operation S17, the machine learning unit 315 may update the logical address pattern in the learned logical address pattern list 314. As described with reference to FIG. 5, the logical address pattern may be divided into input the logical addresses and the predictive logical addresses and may be updated in the learned logical address pattern list 314.

In operation S18, the storage controller 310 may invalidate the reproduction data stored in the nonvolatile memory device 320. In an implementation, the FTL 312 of the storage controller 310 may invalidate the reproduction data by releasing address mapping between the predictive logical addresses and physical addresses indicating a position in which the reproduction data is stored. The invalidated reproduction data may then be removed from the storage space of the nonvolatile memory device 320 by a management operation such as garbage collection.

Even if the reproduction data is not stored in the nonvolatile memory device 320, the reproduction model 316 may reproduce the reproduction data. Since the reproduction data need not be stored in the nonvolatile memory device 320, an available space of the nonvolatile memory device 320 may increase.

Meanwhile, when the reproduction data generated by the reproduction model 316 is no longer valid for the host, the logical address pattern stored in the learned logical address pattern list 314 may be removed.

FIG. 6B illustrates a method of updating a learned logical address pattern list in response to a write request from a host.

In operation S21, the storage controller 310 may receive logical addresses along with the write request.

In operation S22, the storage controller 310 may determine whether the received logical addresses overlap the logical address pattern of the learned logical address pattern list 314.

When the received logical addresses do not overlap the logical address pattern ("No" in operation S22), in operation S23, the storage controller 310 may perform the write request. In an implementation, the storage controller 310 may receive data with the write request, store the received data in the nonvolatile memory device 320, and update the address mapping between the received logical addresses and the physical addresses of the nonvolatile memory device 320.

When the received logical addresses overlap the logical address pattern ("Yes" in operation S22), in operation S24, the storage controller 310 may perform the write request similarly to the operation S23. When the write request in the operation S24 is performed, the reproduction data associated with the logical address pattern may no longer be valid for the host. In an implementation, the reproduction data generated based on the reproduction model 316 may be different from the data stored in the nonvolatile memory device 320. In operation S25, the storage controller 310 may delete the logical address pattern from the learned logical address pattern list 314.

Figure 7:
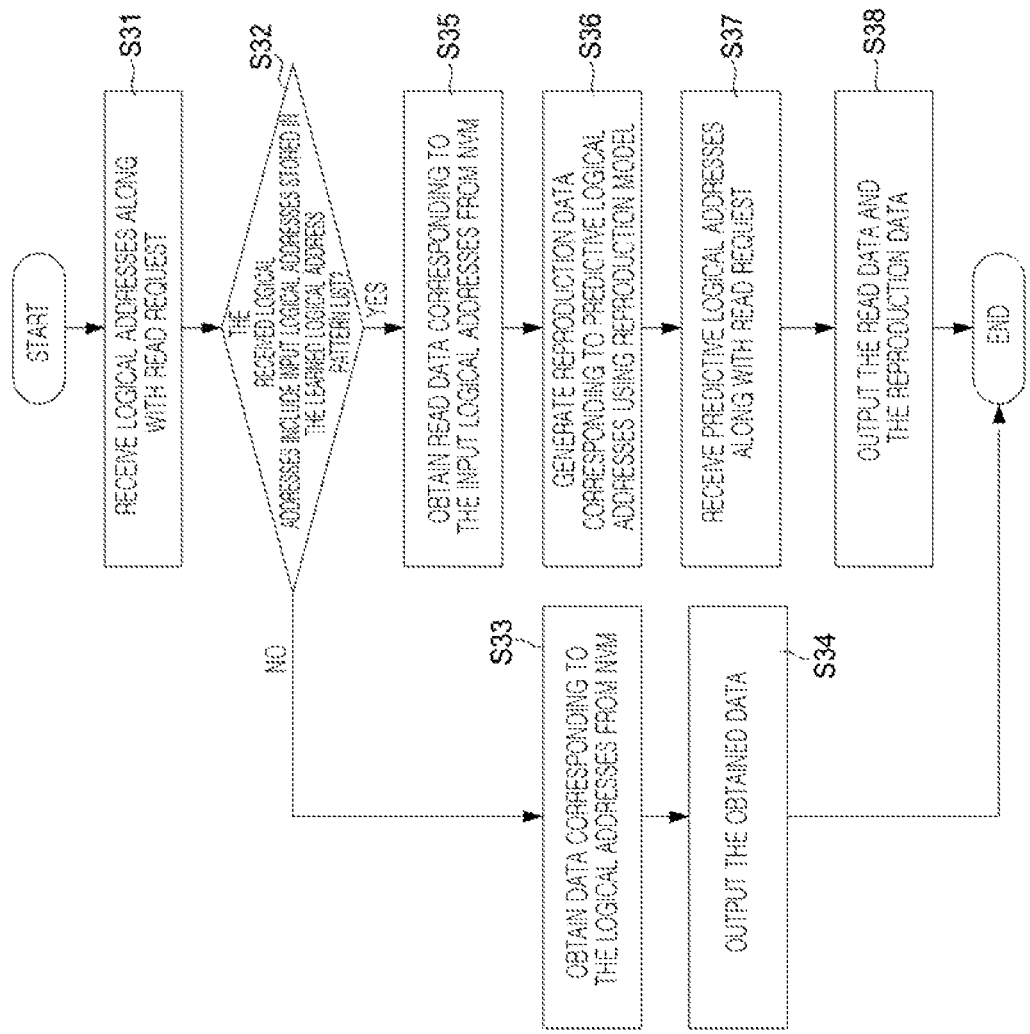
FIG. 7 is a flowchart of a method of responding to a read request according to an example embodiment.

FIG. 7 is a flowchart of a method of responding to a read request according to an example embodiment. In operation S31, the storage controller 310 may receive logical addresses along with a read request from the host. In operation S32, the storage controller 310 may determine whether the received logical addresses include input logical addresses stored in the learned logical address pattern list 314.

When the received logical addresses do not include the input logical addresses ("No" in operation S32), in operation S33, the storage controller 310 may obtain data corresponding to the logical addresses from the nonvolatile memory device 320. Then, in operation S34, the storage controller 310 may output the obtained data to the host.

When the received logical addresses include the input logical addresses ("Yes" in operation S32), in operation S35, the storage controller 310 may obtain read data corresponding to the input logical addresses from the nonvolatile memory device 320. Then, in operation S36, the storage controller 310 may generate reproduction data by predicting predictive logical addresses paired with the input logical addresses and inputting the predictive logical addresses into the reproduction model 316. In addition, the storage controller 310 may prefetch the generated reproduction data to the buffer memory 317. The operations S35 and S36 may be performed simultaneously.

In operation S37, the storage controller 310 may further receive the predictive logical addresses along with the read request. The operation S37 may be performed simultaneously with the operations S35 and S36. In operation S38, the storage controller 310 may output the read data and the reproduction data to the host.

Figure 8:
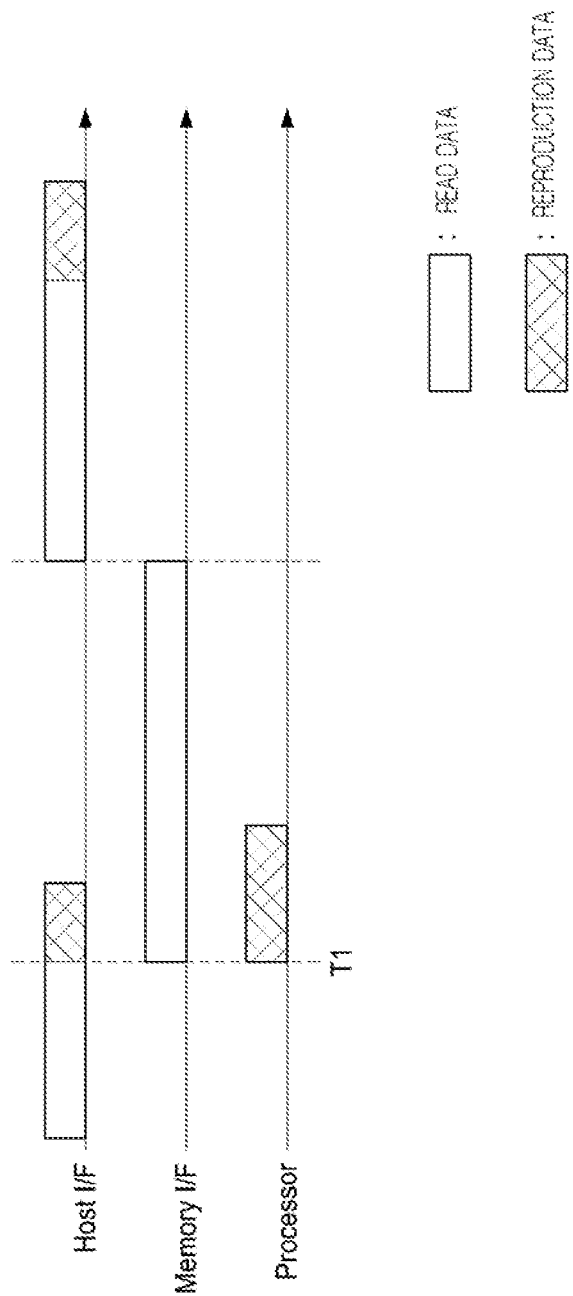
FIG. 8 is a diagram of an effect of reducing a response time according to an example embodiment.

FIG. 8 is a diagram of an effect of reducing response time according to an example embodiment. FIG. 8 shows a time when a host interface, a memory interface, and a processor included in the storage controller 310 perform operations associated with the read data and reproduction data.

The host interface may receive logical addresses corresponding to the logical address pattern from the host along with the read request. In the embodiment of FIG. 8, read requests for the logical addresses may be sequentially received. In an implementation, read requests associated with input logical addresses corresponding to read data may be received first, and then read requests associated with predictive logical addresses corresponding to the reproduction data may be received.

In the host interface, a read operation on the read data may be performed from a first time point T1 at which the read requests associated with the input logical addresses are received. Then, from the first time point T1, the predictive logic addresses may be predicted, and an operation of generating the reproduction data may be performed. The read requests associated with the predictive logical addresses may be received by the host interface after the first time point T1. In an implementation, the storage device may prepare the reproduction data corresponding to the predictive logical addresses before receiving read requests for all logical addresses included in the logical address pattern.

From the first time point T1 to a second time point T2, the storage controller may obtain the read data from the nonvolatile memory device using the memory interface. The processor may obtain the read data and generate the reproduction data at the same time.

At the second time point T2, both the read data and the reproduction data may be buffered in the buffer memory. In an implementation, a data obtaining time may be reduced as compared to a case where the storage controller obtains all the data patterns from the nonvolatile memory device. The host interface may output the read data and the reproduction data to the host after the second time point T2.

The storage device may predict the predictive logical addresses based on the input logical addresses and generate the reproduction data before receiving the read requests associated with the predictive logical addresses. In addition, since the storage device obtains only the read data from the nonvolatile memory device and the reproduction data may be generated from the processor, the data pattern may be rapidly obtained despite a read operation speed of the nonvolatile memory device or a data transmission speed of the memory interface. Accordingly, the response time of the storage device to the read requests may be improved.

Meanwhile, an example embodiment of the present disclosure has been described with reference to FIGS. 2 to 8 as an example in which the storage device generates the reproduction data based on the predictive logical addresses. In an implementation, the storage device may be machine-trained to generate the reproduction data based on the read data. Hereinafter, a storage device according to a second embodiment will be described with reference to FIGS. 9 to 16.

Figure 9:
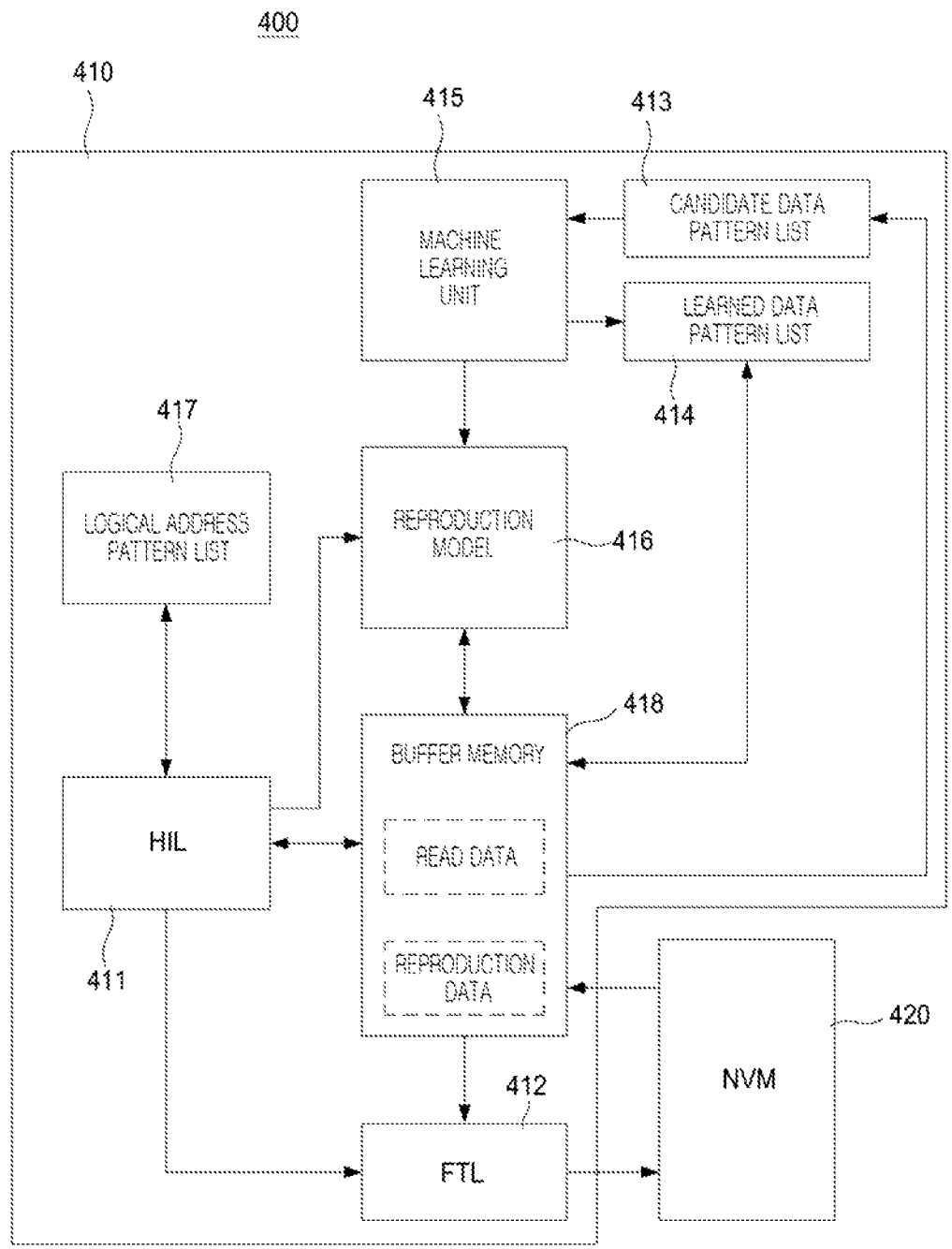
FIG. 9 is a diagram of a storage device according to an example embodiment.

FIG. 9 is a diagram of a storage device according to an example embodiment. Referring to FIG. 9, a storage device 400 may include a storage controller 410 and a nonvolatile memory device 420. The storage device 400, the storage controller 410, and the nonvolatile memory device 420 of FIG. 9 may correspond to the storage device 200, the storage controller 210, and the nonvolatile memory device 220 of FIG. 1, respectively.

The storage controller 410 may include HIL 411, FTL 412, a candidate data pattern list 413, a learned data pattern list 414, a machine learning unit 415, a reproduction model 416, a learned logical address pattern list 417, and a buffer memory 418. The HIL 411, the FTL 412, the machine learning unit 415, and the reproduction model 416 may be loaded in a working memory of the storage controller 410 and executed in the processor. The candidate data pattern list 413, the learned data pattern list 414 and the learned logical address pattern list 417 may be loaded in the working memory of the storage controller 410 or in the buffer memory.

The HIL 411 and the FTL 412 may operate similarly to the HIL 311 and the FTL 312 described with reference to FIG. 2, respectively.

The candidate data pattern list 413 may detect a data pattern frequently requested from the host. In an implementation, the candidate data pattern list 413 may log data patterns read-requested from the host and determine data patterns read-requested at least a predetermined number of times among the data patterns, as candidate data patterns for machine learning.

A data pattern loaded in the nonvolatile memory device 420 by the read request from the host may be stored in the candidate data pattern list 413. As in the case of the candidate logical address pattern list 313 described with reference to FIGS. 4A to 4D, the data patterns may be managed using a caching technique, and the number of read requests of the data patterns may be counted in the candidate data pattern list 413. When an existing data pattern stored in the candidate data pattern list 413 overlaps the loaded data pattern by a predetermined size or more, the existing data pattern may be updated with the overlapped data and the number of read requests may be counted. Among the data patterns, a data pattern in which the number of read requests exceeds a predetermined a threshold value may be selected as a machine learning target.

The learned data pattern list 414 may store a portion of the data patterns in which the machine learning is completed. The storage controller 410 may determine whether data corresponding to logical addresses read-requested from the host corresponds to the data pattern in which the machine learning is completed, using the learned data pattern list 414. The storage controller 410 may rapidly respond to the read request for the logical addresses based on the determination results, and may delete a portion of the data patterns stored in the nonvolatile memory device 420.

The machine learning unit 415 may generate the reproduction model 416 that can generate some data among frequently requested data patterns by performing machine learning. The reproduction model 416 may generate the remaining portion of data of the data pattern using at least some data included in the learned data pattern as an input.

Meanwhile, the same data patterns may be redundantly stored in the nonvolatile memory device 420. In an implementation, data of the same format, such as log data, may be repeatedly generated by the host and redundantly stored in the nonvolatile memory device 420 in duplicate. The same data patterns may be stored in storage spaces indicated by different physical addresses, and different logical addresses may be assigned to the same data patterns.

The learned logical address pattern list 417 may store logical address patterns corresponding to the data pattern. When logical addresses received from the host are included in the logical address pattern list 417, the storage controller 410 may obtain some data from the nonvolatile memory device 420 and generate the remaining data by and inputting the obtained data into the reproduction model 416.

The learned logical address pattern list 417 may be updated as a result of comparing data loaded from the nonvolatile memory device 420, data stored in the learned data pattern list 414 and data generated by the reproduction model 416 by the logical addresses received from the host.

The buffer memory 418 may operate similarly to the buffer memory 317 described with reference to FIG. 2.

Figure 10A:
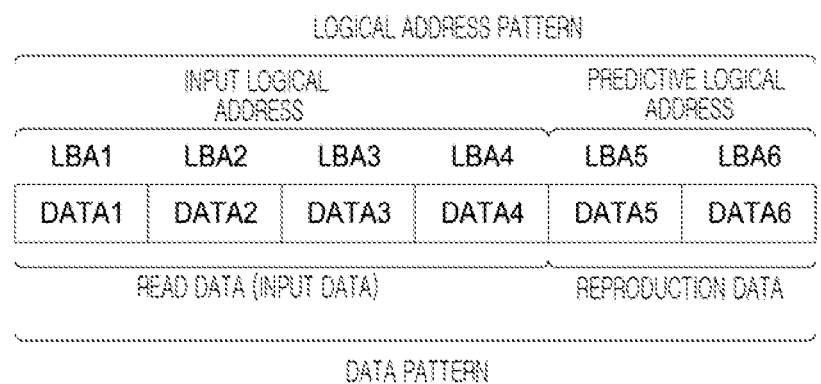
FIGS. 10A and 10B are diagrams of a method of generating a reproduction model according to an example embodiment.
Figure 10B:
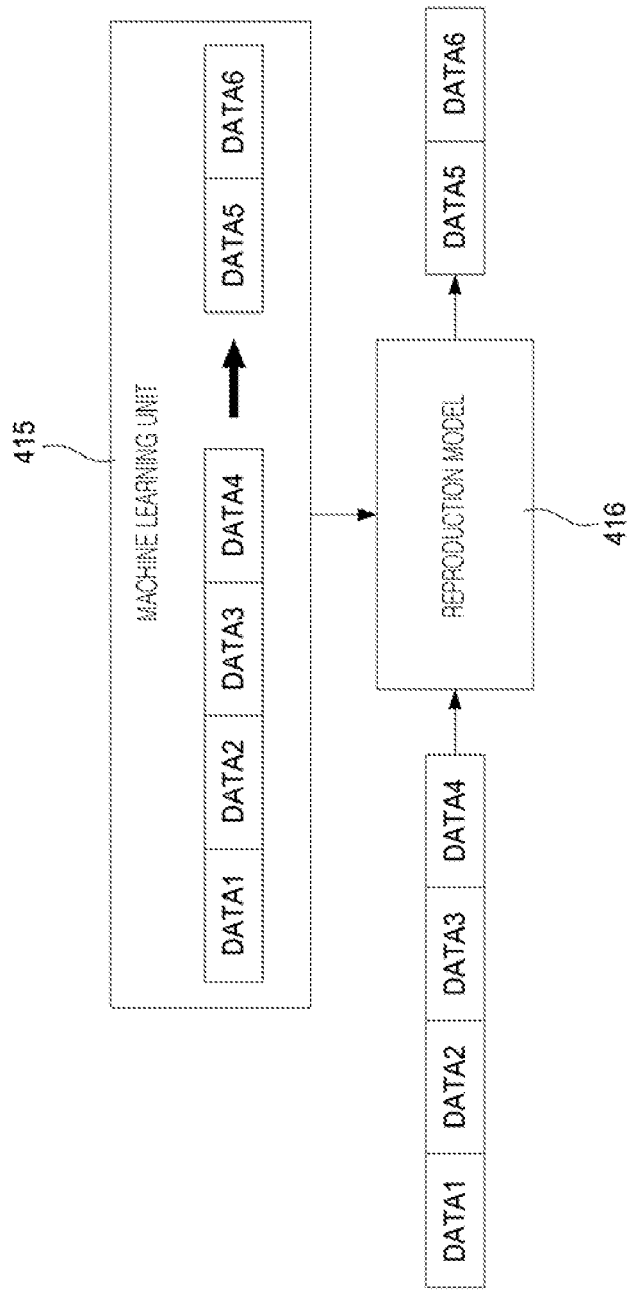

FIGS. 10A and 10B are diagrams of a method of generating a reproduction model according to an example embodiment. FIG. 10A illustrates a structure of a data pattern that is subject to the machine learning. In an implementation, the data pattern may include first to sixth data DATA1 to DATA6. The data pattern may correspond to one logical address pattern or to each of a plurality of logical address patterns. The data pattern may be integrally requested by the host.

The data pattern may include read data DATA1 to DATA4 and reproduction data DATA5 and DATA6. The storage controller 410 may obtain the read data among the data pattern from the nonvolatile memory device 320 and generate the reproduction data using the obtained read data using the reproduction model 416. In the present specification, the read data DATA1 to DATA4 may be referred to as input data input to the reproduction model 416.

Similar to those described with reference to FIG. 3A, the data pattern may correspond to the logical address pattern. In an implementation, the first to sixth data DATA1 to DATA6 may correspond to logical addresses LBA1 to LBA6. The logical addresses corresponding to the read data may be referred to as input logical addresses, and the logical addresses corresponding to the reproduction data may be referred to as predictive logical addresses.

Meanwhile, the data pattern and the logical address pattern do not has to correspond to each other in a one-to-one manner. In an implementation, when the host requests the storage device 400 to store several identical data patterns, the nonvolatile memory device 420 may store the identical data pattern in various positions, and the data pattern may correspond to various logical address patterns.

FIG. 10B illustrates a machine learning method according to an example embodiment. The machine learning unit 415 may perform the machine learning using the input data DATA1 to DATA4 and the reproduction data DATA5 and DATA6 as learning data. When the input data is input to the reproduction model 416, the machine learning unit 415 may repeatedly perform the machine learning until the same data as the reproduction data is output from the reproduction model 416. The machine learning unit 415 may perform the machine learning when the storage device 400 is in an idle state.

The reproduction model 416 in which the machine learning is completed may generate the reproduction data using only input data among the data patterns. In an implementation, data obtained by the storage controller 410 from the nonvolatile memory device 420 in response to the read request from the host may include the input data DATA1 to DATA4. The storage controller 410 may generate the reproduction data DATA5 and DATA6 by inputting the obtained input data DATA1 to DATA4 into the reproduction model 416.

The storage controller 410 may directly generate reproduction data using the reproduction model 416 without obtaining the reproduction data DATA5 and DATA6 from the nonvolatile memory device 420. Accordingly, the reproduction data may be deleted from the nonvolatile memory device 420. When the data patterns DATA1 to DATA6 are redundantly stored in the nonvolatile memory device 420, the reproduction data may be deleted for each of the redundantly stored data patterns. Accordingly, the storage space of the nonvolatile memory device 420 may be efficiently used. Meanwhile, the read data included in the data pattern in which machine learning is completed may be updated in the learned data pattern list 414.

FIG. 11 is a diagram of a learned data pattern list according to an example embodiment. The learned data pattern list 414 may include K indexes (where K is a natural number). The learned data pattern list 414 may store the read data of the data pattern.

The storage controller 410 may obtain data from the nonvolatile memory device 420 in response to the read request received along with the logical addresses from the host. Then, it is determined whether the obtained data are consistent with the data pattern using the learned data pattern list 414.

Hereinafter, a method of updating the logical address pattern list 417 and responding to a read request using the logical address pattern list 417 will be described.

Figure 12A:
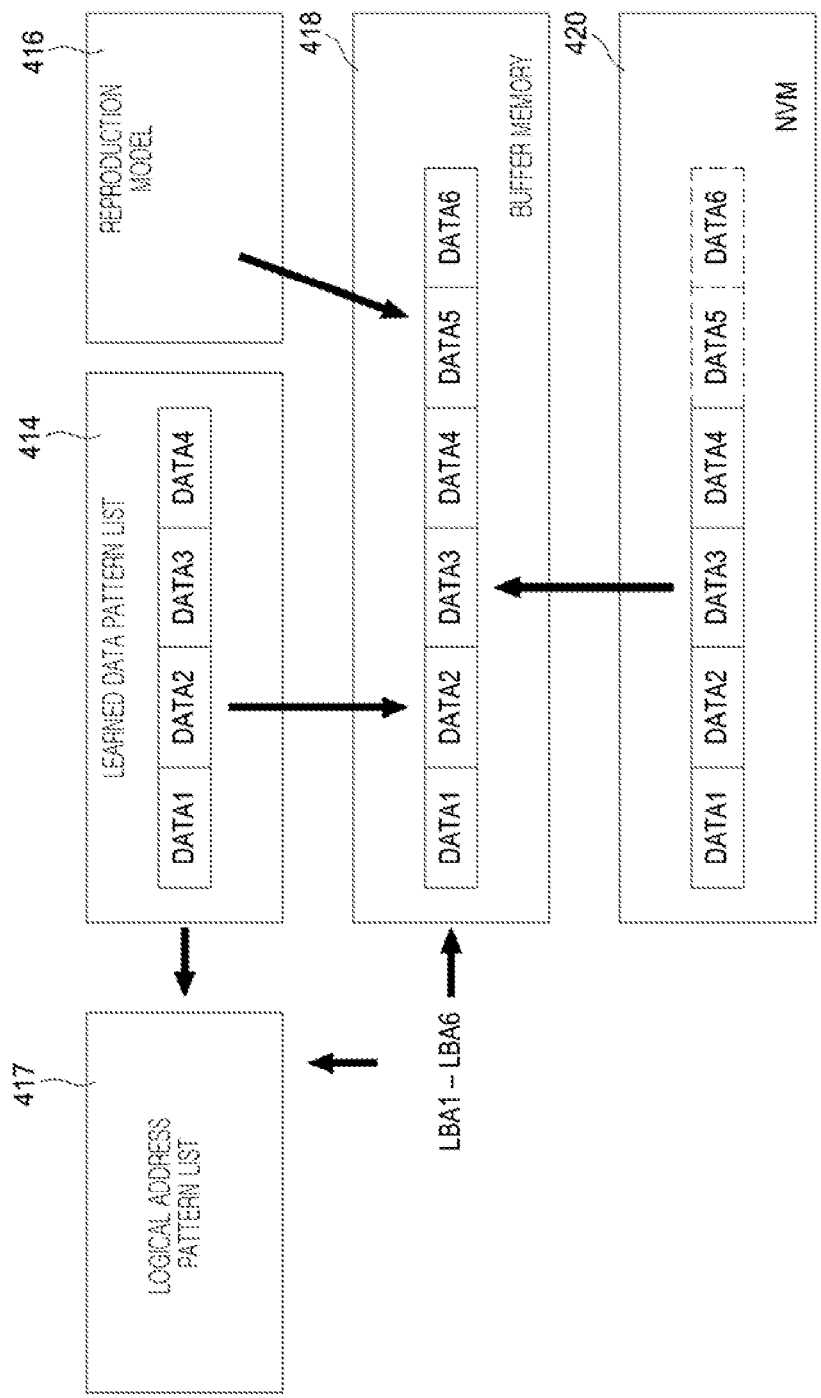
FIG. 12A is a diagram of a method of updating a logical address pattern list according to an example embodiment.
Figure 12B:
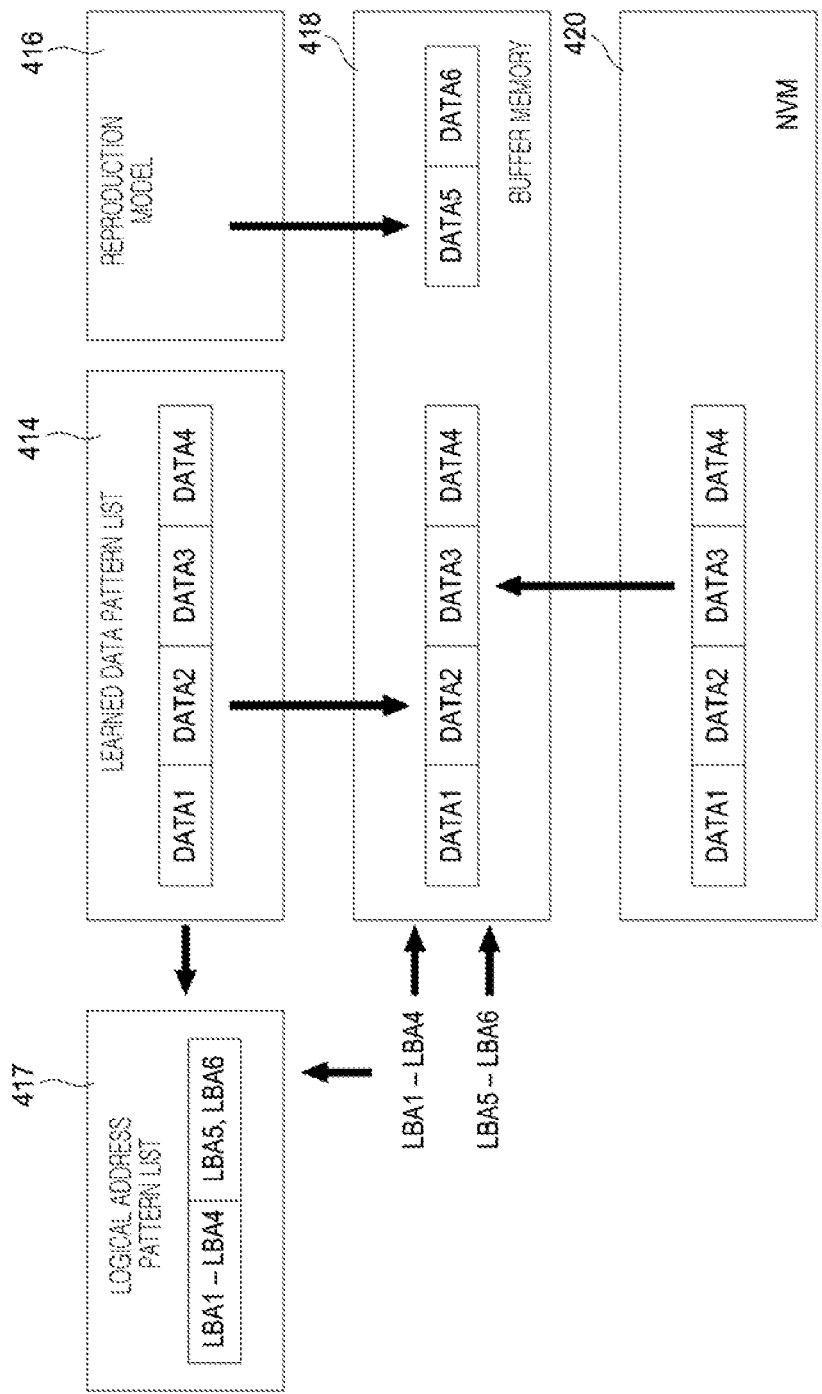
FIG. 12B is a diagram of a method of responding to a read request according to an example embodiment.

FIG. 12A is a diagram of a method of updating a logical address pattern list according to an example embodiment, and FIG. 12B is a diagram of a method of responding to a read request according to an example embodiment.

FIGS. 12A and 12B briefly illustrate the learned data pattern list 414, the reproduction model 416, the logical address pattern list 417, the buffer memory 418 and the nonvolatile memory device 420 included in the storage device 400 described with reference to FIG. 9.

Referring to FIG. 12A, the logical addresses LBA1 to LBA6 may be received from the host along with the read request. The storage controller 410 may determine whether the logical addresses LBA1 to LBA6 are included in the logical address pattern stored in the logical address pattern list 417.

When the logical addresses LBA1 to LBA6 are not included in the logical address pattern, the storage controller 410 may convert the logical addresses LBA1 to LBA6 into physical addresses and load the data DATA1 to DATA6 stored in the nonvolatile memory device 420 in the buffer memory 418.

The storage controller 410 may determine whether the loaded data DATA1 to DATA6 includes the read data of the data pattern by referring to the learned data pattern list 414. In the embodiment of FIG. 12A, the loaded data DATA1 to DATA6 may include the read data DATA1 to DATA4.

The storage controller 410 may generate the reproduction data DATA5 and DATA6 by inputting the read data DATA to DATA4 into the reproduction model 416. The generated reproduction data DATA5 and DATA6 may be compared with data loaded in the buffer memory 418. When the reproduction data DATA5 and DATA6 are included in the loaded data, the storage controller 410 may determine that the data corresponding to the logical addresses LBA1 to LBA6 corresponds to the learned data pattern. The storage controller 410 may update the logical addresses LBA1 to LBA6 in the logical address pattern list 417.

The reproduction data DATA5 and DATA6 corresponding to the predictive logical addresses LBA5 and LBA6 may be removed from the nonvolatile memory device 420. Referring to FIG. 12B, the logical address pattern list 417 may classify and store the logical address patterns LBA1 to LBA6 into input logical addresses LBA1 to LBA4 and predictive logical addresses LBA5 and LBA6.

A read request for the logical addresses LBA1 to LBA6 may be received from the host in a state in which the logical address patterns LBA1 to LBA6 is included in the logical address pattern list 417. In an implementation, one read request including logical addresses LBA1 to LBA6 may be received from the host, and a plurality of read requests may be received sequentially.

The storage controller 410 may determine whether the logical addresses received along with the read request include an input logical address of the logical address pattern list 417. In an implementation, when receiving the read request for the logical addresses LBA1 to LBA4, the storage controller 410 may determine that the logical addresses LBA1 to LBA4 are consistent with the input logical addresses of the logical address pattern list 417.

The storage controller 410 may predict that a read request corresponding to the predictive logical addresses LBA5 and LBA6 will be further received by referring to the logical address pattern list 417. The storage controller 410 may obtain the data DATA1 to DATA4 from the nonvolatile memory device 420 based on the input logical addresses LBA1 to LBA4, and buffer the obtained data DATA1 to DATA4 in the buffer memory 418.

The storage controller 410 may further receive the read request for the logical addresses LBA5 and LBA6. The storage controller 410 may determine whether the logical addresses LBA5 and LBA6 are consistent with the predictive logical addresses by referring to the logical address pattern list 417.

Meanwhile, data corresponding to the predictive logical addresses LBA5 and LBA6 may no longer be stored in the nonvolatile memory device 420. The storage controller 410 may generate the reproduction data DATA5 and DATA6 by inputting the data DATA1 to DATA4 buffered in the buffer memory 418 into the reproduction model 416. The reproduction data DATA5 and DATA6 may be buffered in the buffer memory 148.

The storage controller 410 may output the data DATA1 to DATA6 buffered in the buffer memory 148 to the host in response to the read requests for the logical addresses LBA1 to LBA6.

Figure 13:
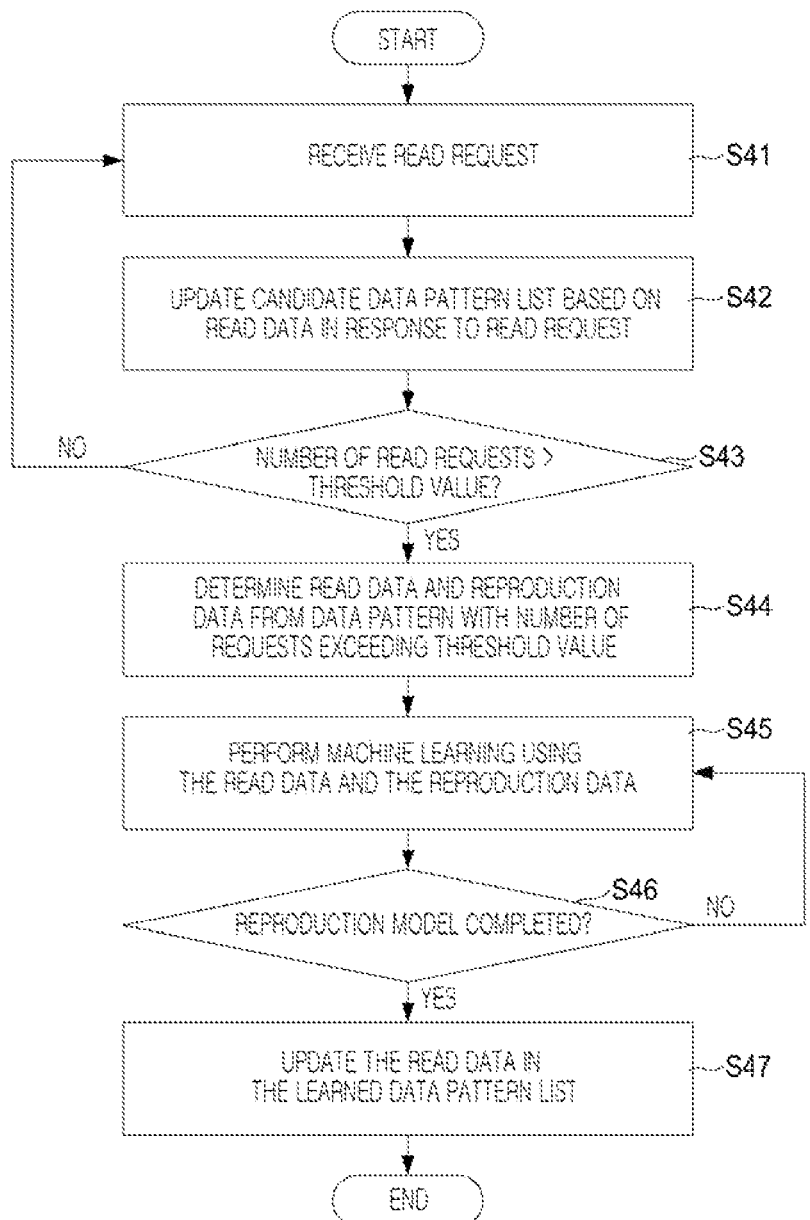
FIG. 13 is a flowchart of a method of updating a data pattern list according to an example embodiment.

FIG. 13 is a flowchart of a method of updating a data pattern list according to an example embodiment. In operation S41, the storage controller 410 may receive a read request from the host. In operation S42, the storage controller 410 may update the candidate data pattern list 413 based on read data in response to the read request.

In operation S43, the storage controller 410 may determine whether there is a data pattern in which the number of read requests in the candidate data pattern list 413 exceeds the threshold value.

When there is no data pattern in which the number of read requests exceeds the threshold value ("No" in operation S43), the storage controller 410 may return to operation S41.

When detecting a data pattern in which the number of read requests exceeds the threshold value ("Yes" in operation S43), the storage controller 410 may determine read data and reproduction data from the data pattern. The data pattern may be logically continuous data. In an implementation, logical addresses corresponding to the data pattern may be continuous. The read data may correspond to logical addresses that precede in order, and the reproduction data may be data following the read data.

Meanwhile, the sizes of read data and reproduction data in the data pattern may vary depending on implementation. As a first example, the sizes of the read data and the reproduction data may be determined based on the performance of the processor on which the reproduction model 416 is executed. As a second example, the sizes of the read data and the reproduction data may be determined by further considering the storage capacity provided by the learned data pattern list 414.

In operation S45, the machine learning unit 415 of the storage controller 410 may generate the reproduction model 416 by performing the machine learning using the read data and the reproduction data. In operation S46, the machine learning unit 415 may determine whether the reproduction model 416 is completed. When the read data is input to the reproduction model 416, the machine learning unit 415 may determine that the reproduction model 416 is completed when the same data as the reproduction data is output from the reproduction model 416.

When the reproduction model is not completed ("No" in operation S46), the machine learning unit 415 may repeatedly perform the operation S45. When the reproduction model is completed ("Yes" in operation S46), in operation S47, the storage controller 410 may update the read data in the learned data pattern list 414.

Figure 14A:
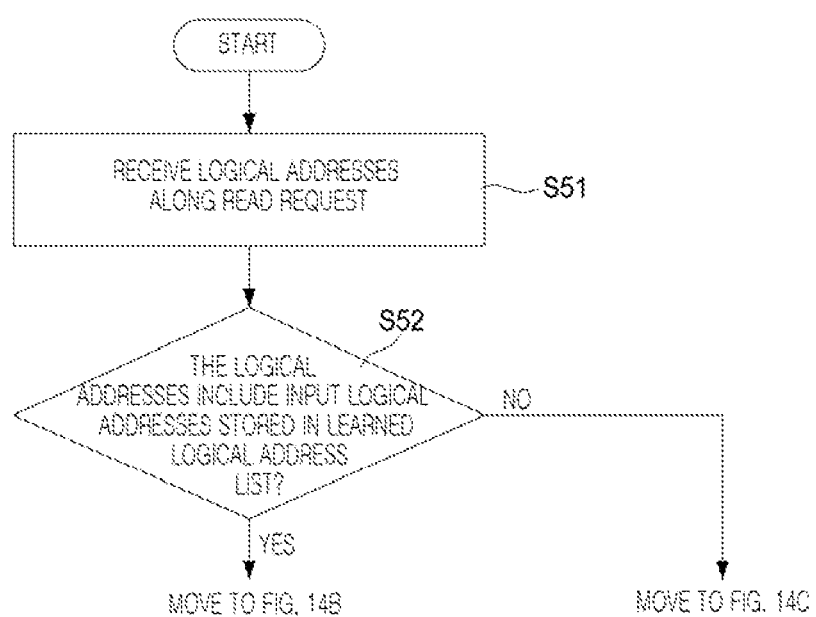
FIGS. 14A to 14C are flowcharts of a method of responding to a read request according to an example embodiment.
Figure 14B:
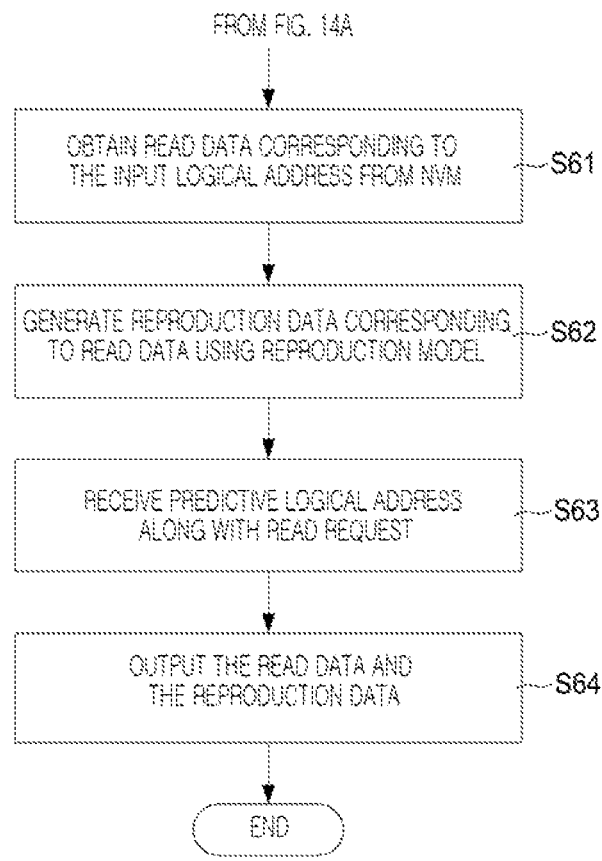
Figure 14C:
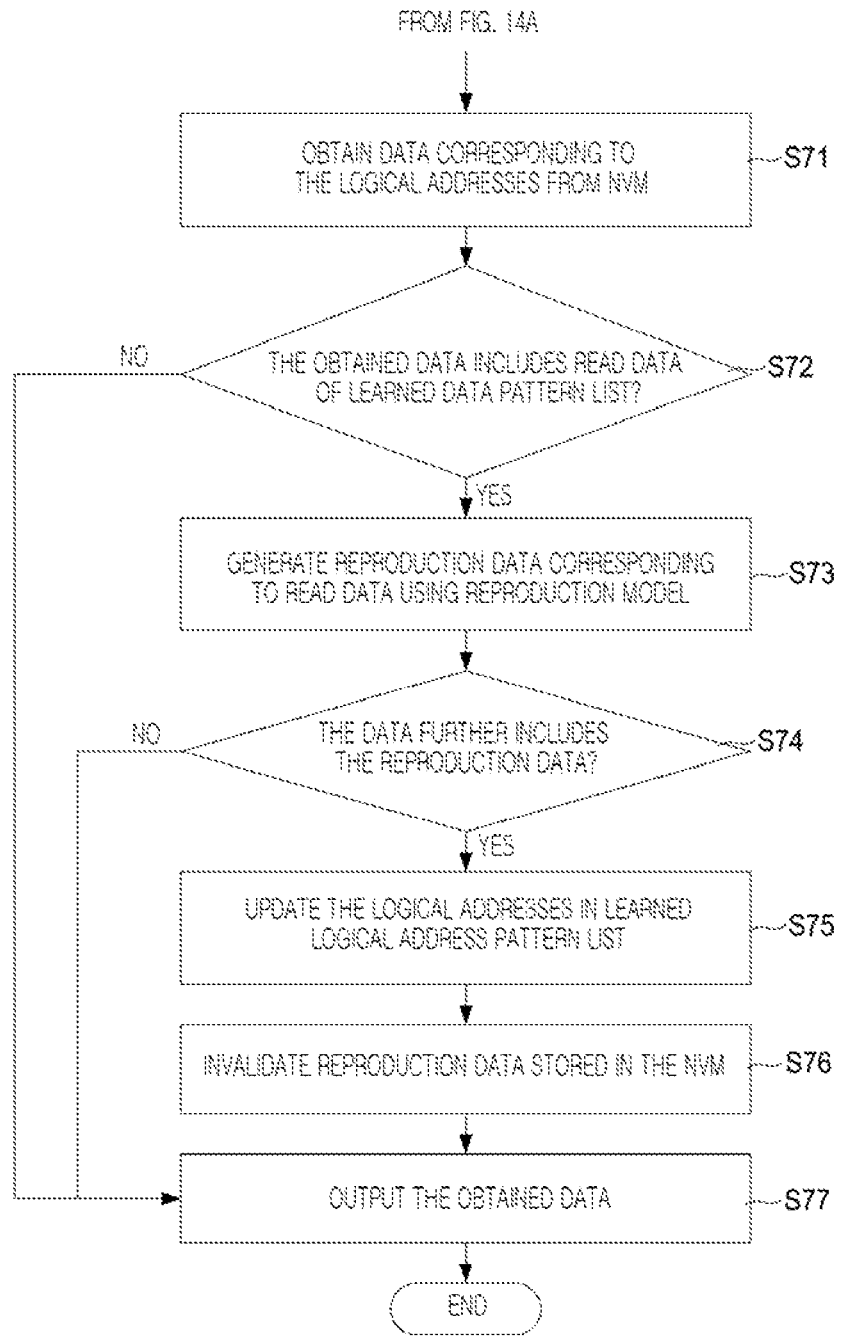

FIGS. 14A to 14C are flowcharts of a method of responding to a read request according to an example embodiment. In an implementation, FIGS. 14A to 14C describe a method of storing logical addresses received along with the read request in the logical address pattern list 417 and a method of obtaining read data and generating reproduction data based on the logical address pattern stored in the logical address pattern list 417.

Referring to FIG. 14A, in operation S51, the storage controller 410 may receive logical addresses along with the read request from the host.

In operation S52, the storage controller 410 may determine whether the received logical addresses include the input logical addresses stored in the logical address pattern list 417.

When the received logical addresses include the input logical address ("Yes" in operation S52), the storage controller 410 may perform operations S61 to S64 of FIG. 14B.

When the received logical addresses do not include the input logical address ("No" in operation S52), the storage controller 410 may perform operations S71 to S77 of FIG. 14C.

Referring to FIG. 14B, in operation S61, the storage controller 410 may obtain read data corresponding to the input logical address from the nonvolatile memory device 420.

In operation S62, the storage controller 410 may generate the reproduction data corresponding to the read data using the reproduction model 416. In an implementation, the storage controller 410 may input the obtained read data into the reproduction model 416 and obtain the reproduction data from the reproduction model 416. Then, the storage controller 410 may prefetch the reproduction data to the buffer memory 418.

In operation S63, the storage controller 410 may receive a predictive logical address from the host. The predictive logical address may be included in the logical addresses received in the operation S41, or may be received along with a new read request.

In operation S64, the storage controller 410 may output the read data and the reproduction data to the host.

The storage controller 410 does not obtain all data patterns from the nonvolatile memory device 420, and may generate the reproduction data among the data patterns using the reproduction model 416. Accordingly, the storage controller 410 may rapidly obtain the data pattern and provide the obtained data pattern to the host despite the read operation speed of the nonvolatile memory device 420 and the data transmission speed of the memory interface. Accordingly, the response speed of the storage controller 410 may be improved.

Referring to FIG. 14C, in operation S71, the storage controller 410 may obtain data corresponding to the logical addresses from the nonvolatile memory device 420.

In operation S72, the storage controller 410 may determine whether the obtained data includes the read data stored in the learned data pattern list 414.

When the obtained data does not include the read data ("No" in operation S72), the storage controller 410 may output the obtained data to the host in operation S77. Meanwhile, as illustrated in operation S42 described with reference to FIG. 13, the storage controller 410 may update the candidate data pattern list 413 based on the obtained data.

When the obtained data includes the read data ("Yes" in operation S72), in operation S73, the storage controller 410 may generate reproduction data corresponding to the read data using the reproduction model 416.

In operation S74, the storage controller 410 may determine whether the obtained data further includes the reproduction data.

When the obtained data does not include the reproduction data ("No" in operation S74), the storage controller 410 may output the obtained data to the host in operation S77.

When the obtained data includes the reproduction data ("Yes" in operation S74), in operation S75, the storage controller 410 may update the logical addresses received along with the read request in the logical address pattern list 417.

Meanwhile, the storage controller 410 may further receive a write request including logical addresses. When the storage controller 410 performs the write request for logical addresses included in the logical address pattern list 417, data corresponding to the logical addresses may be changed. Accordingly, when the logical addresses received along with the write request overlap the logical address pattern included in the logical address pattern list 417, the storage controller 410 may remove the logical address pattern from the logical address pattern list 417.

In operation S76, the storage controller 410 may invalidate reproduction data corresponding to a predictive logical address among the logical addresses in the nonvolatile memory device 420. Then, in operation S77, the storage controller 410 may output the obtained data to the host.

The storage controller 410 may generate the reproduction data using the reproduction model 416, even if the reproduction data is not stored in the nonvolatile memory device 420. Accordingly, the storage space of the nonvolatile memory device 420 may be efficiently used by invalidating the reproduction data stored in the nonvolatile memory device 420.

In an implementation, some data patterns may be overlapped in various positions of the storage space of the nonvolatile memory device 420. For each of the same data patterns stored in the nonvolatile memory device 420, the reproduction data among the data pattern may be removed from the nonvolatile memory device 420 when the data pattern is read-requested. Accordingly, when the data pattern is redundantly stored in the nonvolatile memory device 420, the storage space of the nonvolatile memory device 420 may be used more efficiently.

Meanwhile, according to the embodiment described with reference to FIGS. 9 to 14C, the data pattern is divided into read data and reproduction data, and the reproduction model 416 may be machine-trained so as to generate the reproduction data paired with the read data when all read data is input. In an implementation, the reproduction model 416 may be machine-trained so as to generate the reproduction data when a portion of the read data is input. Hereinafter, a storage device according to an example embodiment of the present disclosure will be described with reference to FIGS. 15A to 16B.

Figure 15A:
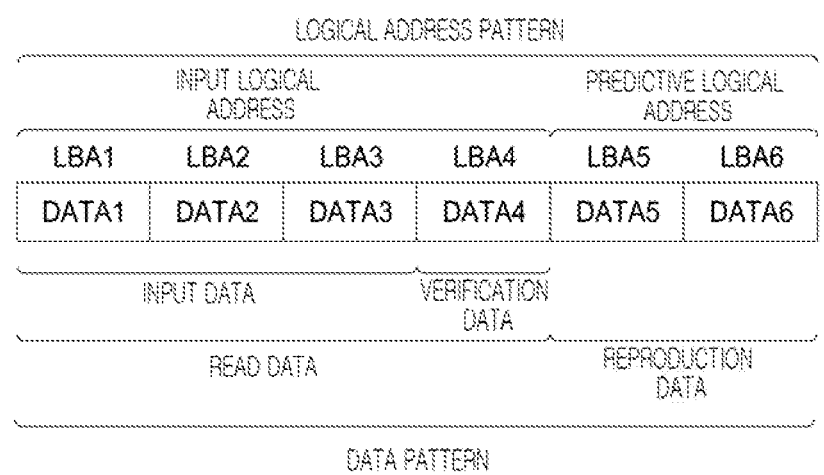
FIGS. 15A and 15B are diagrams of a method of generating a reproduction model according to an example embodiment.
Figure 15B:
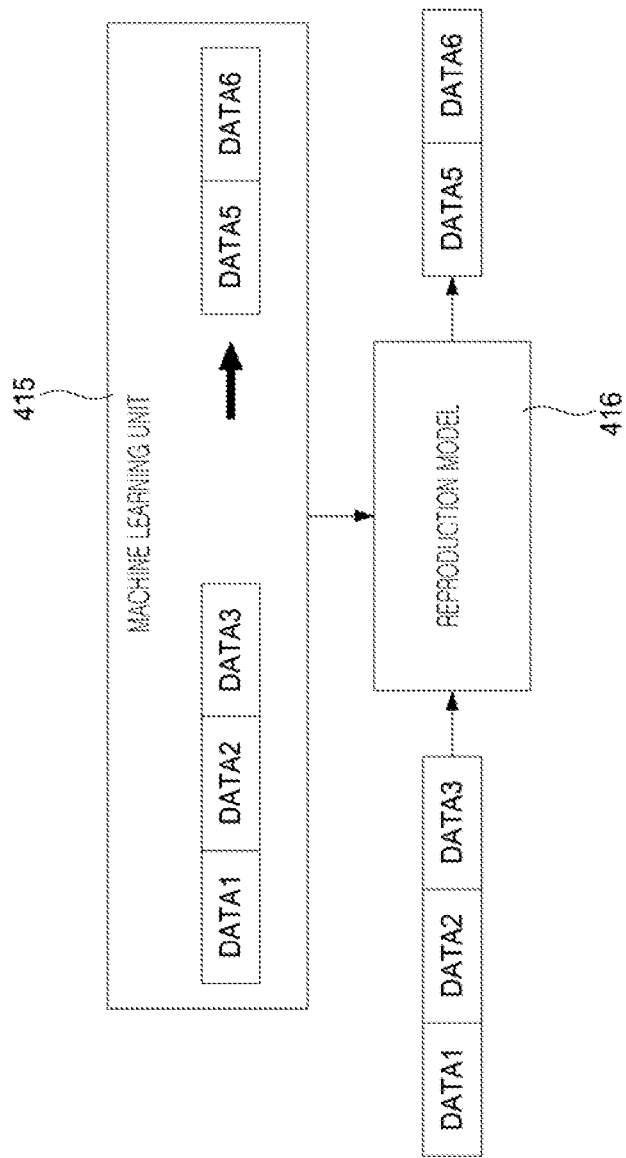

FIGS. 15A and 15B are diagrams of a method of generating a reproduction model according to an example embodiment.

FIG. 15A illustrates a structure of a data pattern that is subject to the machine learning. The data pattern may include the first to sixth data DATA1 to DATA6. The data pattern may include the read data DATA1 to DATA4 and the reproduction data DATA5 and DATA6. The storage controller 410 may obtain read data among data patterns from the nonvolatile memory device 320 and generate the reproduction data using the obtained read data using the reproduction model 416.

The read data DATA1 to DATA4 may include the input data DATA1 to DATA3 and verification data DATA4. The input data DATA1 to DATA3 may refer to data input to the reproduction model 416 among the read data DATA1 to DATA4. In addition, the verification data DATA4 may be data for verifying whether the read data stored in the learned data pattern list 414 may be consistent with data obtained from the nonvolatile memory device 420.

FIG. 15B illustrates a machine learning method according to an example embodiment. The machine learning unit 415 may perform the machine learning using the input data DATA1 to DATA3 and the reproduction data DATA5 and DATA6 as learning data. When the input data is input to the reproduction model 416, the machine learning unit 415 may repeatedly perform the machine learning until the same data as the reproduction data is output from the reproduction model 416.

The reproduction model 416 in which the machine learning is completed may generate the reproduction data using only the input data. In an implementation, when the data obtained by the storage controller 410 from the nonvolatile memory device 420 in response to the read request from the host includes the input data DATA1 to DATA3, the storage controller 410 may generate the reproduction data DATA5 and DATA6 by inputting the input data DATA1 to DATA3 into the reproduction model 416. Meanwhile, the read data included in the data pattern in which machine learning is completed may be updated in the learned data pattern list 414.

Figure 16A:
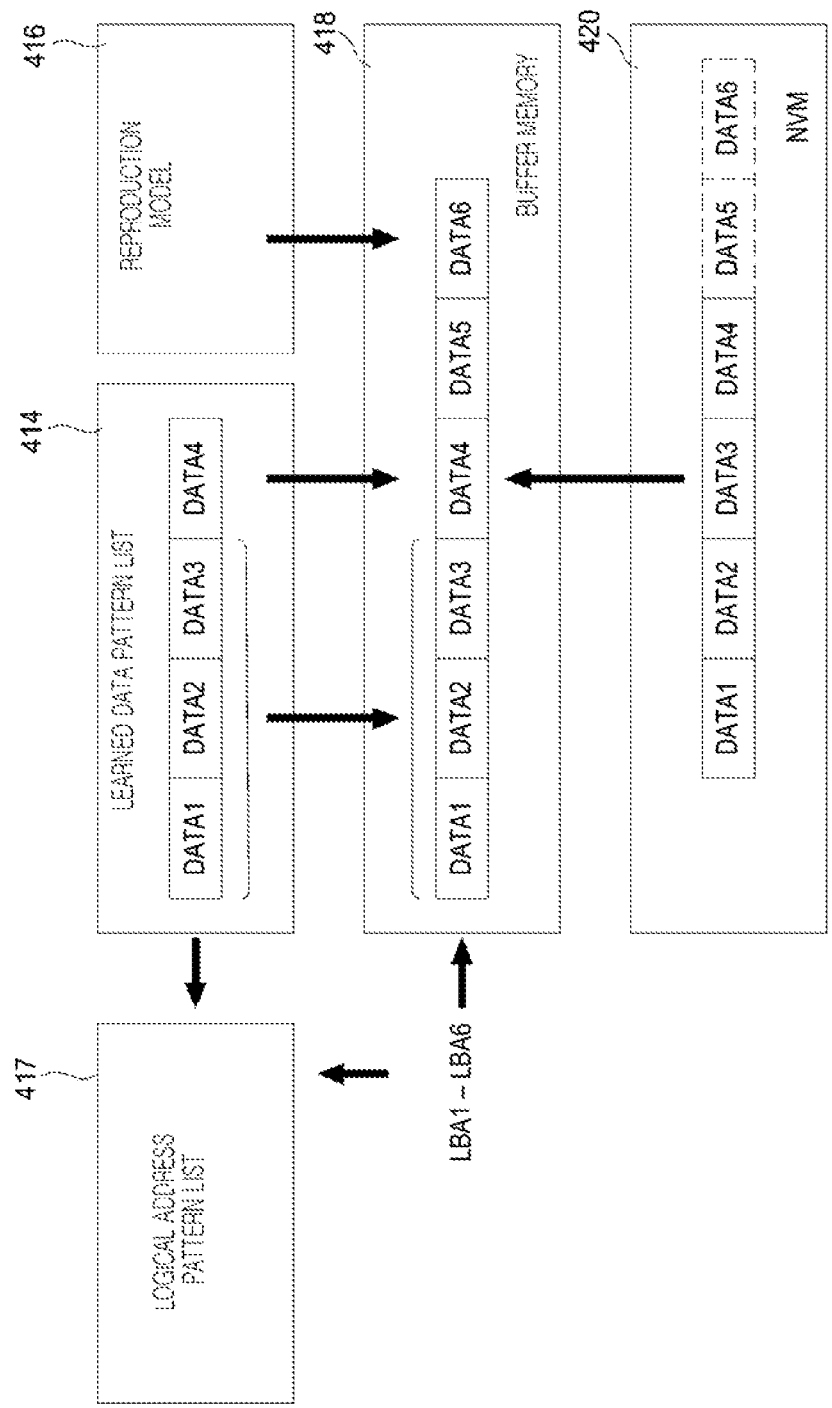
FIG. 16A is a diagram of a method of updating a logical address pattern list according to an example embodiment.
Figure 16B:
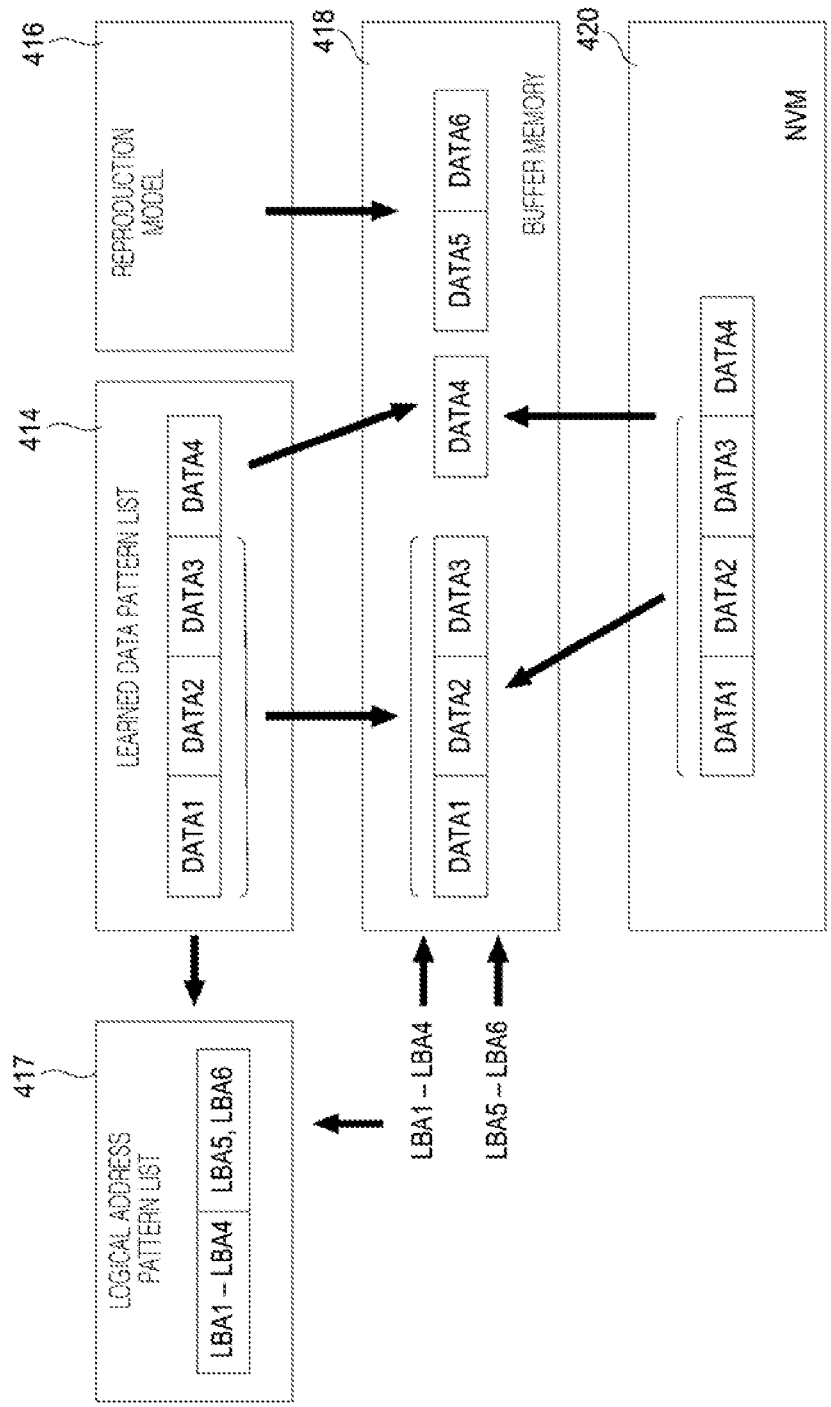
FIG. 16B is a diagram of a method of responding to a read request according to an example embodiment.

FIG. 16A is a diagram of a method of updating a logical address pattern list according to an example embodiment, and FIG. 16B is a diagram of a method of responding to a read request according to an example embodiment.

FIGS. 16A and 16B briefly illustrate the learned data pattern list 414, the reproduction model 416, the logical address pattern list 417, the buffer memory 418, and the nonvolatile memory device 420 included in the storage device 400 described with reference to FIG. 9.

In the embodiment of FIG. 16A, the logical addresses LBA1 to LBA6 received from the host may not be included in the logical address pattern list 417. In the embodiment of FIG. 16A, the storage device 400 may operate in a similar manner to the storage device 400 described in FIG. 12A, except that the reproduction data DATA5 and DATA6 are generated using only a portion of the read data DATA1 to DATA4. Hereinafter, an example embodiment of the present disclosure will be described centering on the difference from FIG. 12A.

The storage controller 410 may determine whether the data DATA1 to DATA6 loaded in the buffer memory 418 includes the read data of the data pattern in response to the read request. In the embodiment of FIG. 16A, the loaded data DATA1 to DATA6 may include the read data DATA1 to DATA4.

The storage controller 410 may generate the reproduction data DATA5 and DATA6 by inputting the input data DATA1 to DATA3 among the read data to the reproduction model 416. When the reproduction data DATA5 and DATA6 are included in the loaded data, the storage controller 410 may determine that the data corresponding to the logical addresses LBA1 to LBA6 correspond to the learned data pattern. The storage controller 410 may update the logical addresses LBA1 to LBA6 to the logical address pattern list 417. Meanwhile, the data DATA5 and DATA6 may be removed from the nonvolatile memory device 420.

Referring to FIG. 16B, the logical address pattern list 417 may classify and store the logical address patterns LBA1 to LBA6 into the input logical addresses LBA1 to LBA4 and the predictive logical addresses LBA5 and LBA6.

When the read request for the logical addresses LBA1 to LBA4 is received from the host in a state in which the logical address patterns LBA1 to LBA6 are included in the logical address pattern list 417, it may be determined that the logical addresses LBA1 to LBA4 are consistent with the input logical address of the logical address pattern list 417.

The storage controller 410 may obtain the data DATA1 to DATA4 from the nonvolatile memory device 420 based on the logical addresses LBA1 to LBA4, and may buffer the obtained data DATA1 to DATA4 in the buffer memory 418.

The storage controller 410 may further receive the read request for the logical addresses LBA5 and LBA6. The storage controller 410 may determine whether the logical addresses LBA5 and LBA6 are predictive logical addresses paired with the input logical addresses LBA1 to LBA4 by referring to the logical address pattern list 417.

The first to fourth data DATA1 to DATA4 may be sequentially buffered in the buffer memory 418 through the memory interface. The first to third data DATA1 to DATA3 may be input to the reproduction model 416 in a state in which only the first to third data DATA1 to DATA3 are buffered in the buffer memory 418. The reproduction model 416 may generate the reproduction data DATA5 and DATA6, and may buffer the generated reproduction data DATA5 and DATA6 in the buffer memory 418. The operation of generating and buffering the reproduction data DATA5 and DATA6 by the reproduction model 416 may be performed simultaneously with an operation of loading the fourth data DATA4 from the nonvolatile memory device 420 to the buffer memory 418.

After the fourth data DATA4 is loaded into the buffer memory 418, the storage controller 410 may verify whether the data obtained from the nonvolatile memory device 420 are identical to the data stored in the learned data pattern list 414, by comparing verification data included in the learned data pattern list 414 with the fourth data DATA4 loaded in the buffer memory 418. When the verification is completed, the storage controller 410 may output the data DATA1 to DATA6 to the host in response to the read requests for the logical addresses LBA1 to LBA6.

The storage controller 410 may generate the reproduction data by inputting a portion of the read data output from the nonvolatile memory device 420 into the reproduction model 416. The storage controller 410 may generate the reproduction data before loading all the read data in the buffer memory 418, and may load the remaining read data simultaneously with generating the reproduction data. In an implementation, since a portion of the operation of reading the read data and the operation of generating the reproduction data may be simultaneously performed, the response speed of the storage device 400 in response to the read request from the host may be improved.

Hereinafter, an example of a nonvolatile memory device that may be applied to a storage device according to an example embodiment of the present disclosure will be described in detail with reference to FIGS. 17 and 18.

Figure 17:
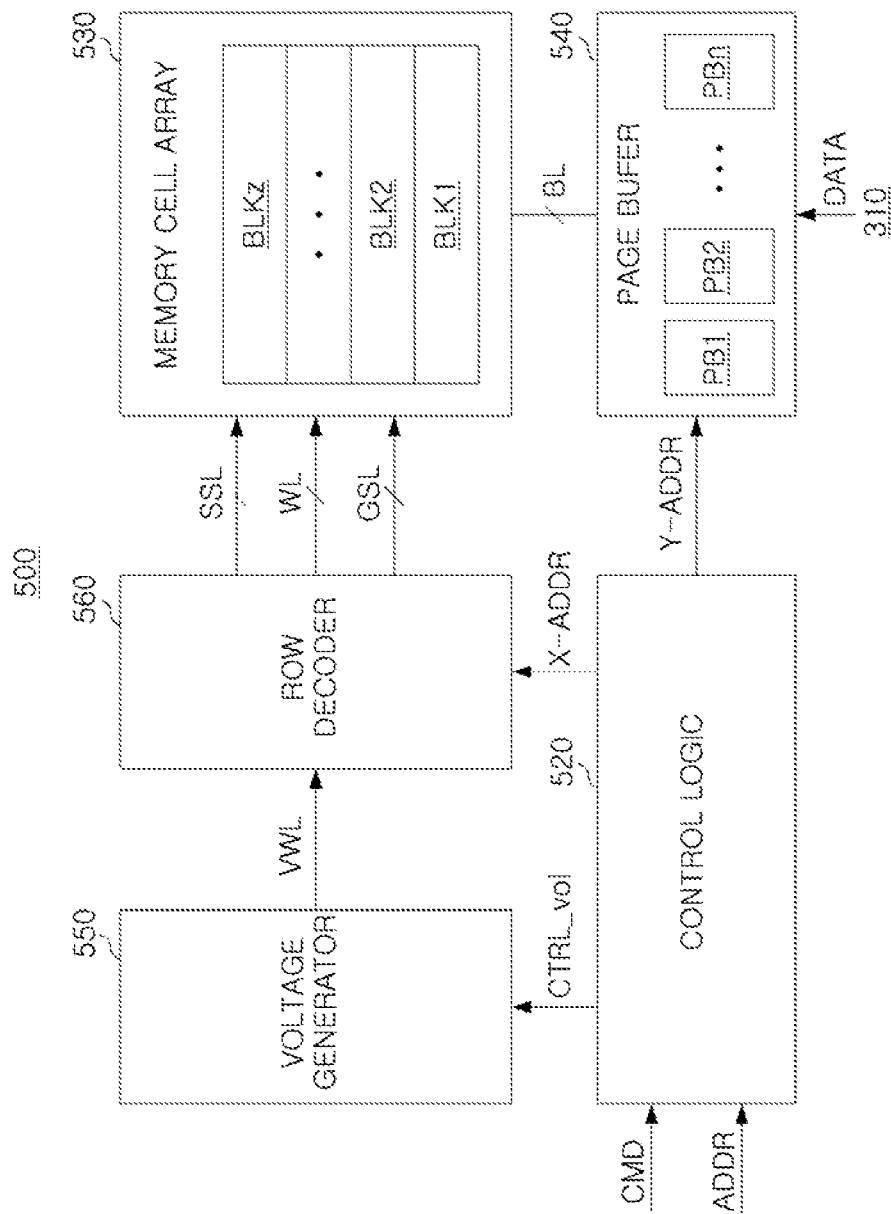
FIG. 17 is a diagram of a nonvolatile memory device according to an example embodiment.

FIG. 17 is a diagram of a nonvolatile memory device according to an example embodiment. FIG. 17 is an exemplary block diagram illustrating a nonvolatile memory.

Referring to FIG. 17, the nonvolatile memory 500 may include a control logic circuit 520, a memory cell array 530, a page buffer 540, a voltage generator 550, and a row decoder 560. The nonvolatile memory 500 may further include a memory interface circuit for receiving commands (CMD) and addresses (ADDR) from the outside and exchanging data (DATA) with the outside, and may further include a column logic, a pre-decoder, a temperature sensor, a command decoder, and an address decoder.

The control logic circuit 520 may generally control various operations in the nonvolatile memory 500. The control logic circuit 520 may output various control signals in response to a command CMD and/or an address ADDR from the memory interface circuit 510. In an implementation, the control logic circuit 520 may output a voltage control signal CTRL_vol, a row address X-ADDR, and a column address Y-ADDR.

The memory cell array 530 may include a plurality of memory blocks BLK1 to BLKz (where z is a positive integer), and each of the plurality of memory blocks BLK1 to BLKz may include a plurality of memory cells. The memory cell array 530 may be connected to the page buffer 540 through bit lines BL, and may be connected to the row decoder 560 through word lines WL, string selection lines SSL, and ground selection lines GSL.

In an example embodiment, the memory cell array 530 may include a three-dimensional (3D) memory cell array, and the 3D memory cell array may include a plurality of NAND strings. Each of the NAND strings may include memory cells connected to each of the word lines vertically stacked on a substrate. U.S. Pat. Nos. 7,679,133, 8,553,466, 8,654,587, 8,559,235, and U.S. Patent Application Publication No. 2011/0233648 are hereby incorporated by reference. In an example embodiment, the memory cell array 530 may include a two-dimensional (2D) memory cell array, and the 2D memory cell array may include a plurality of NAND strings arranged in row and column directions.

The page buffer 540 may include a plurality of page buffers PB1 to PBn (where n is an integer of 3 or more), and the plurality of page buffers PB1 to PBn may be connected to the memory cells through the plurality of bit lines BL, respectively. The page buffer 540 may select at least one bit line among the bit lines BL in response to the column address Y-ADDR. The page buffer 540 may operate as a write driver or a sense amplifier according to an operation mode. In an implementation, during a program operation, the page buffer 540 may apply a bit line voltage corresponding to data programmed with the selected bit line. During a read operation, the page buffer 540 may detect data stored in the memory cell by detecting a current or a voltage of the selected bit line.

The voltage generator 550 may generate various types of voltages for performing a program operation, a read operation, and an erase operation based on the voltage control signal CTRL_vol. In an implementation, the voltage generator 550 may generate a program voltage, a read voltage, a program verification voltage and an erase voltage, as a word line voltage VWL.

The row decoder 560 may select one of the plurality of word lines WL and one of the plurality of string selection lines SSL in response to the row address X-ADDR. In an implementation, the row decoder 560 may apply the program voltage and the program verification voltage to the selected word line during the program operation, and may apply the read voltage to the selected word line during the read operation.

Figure 18:
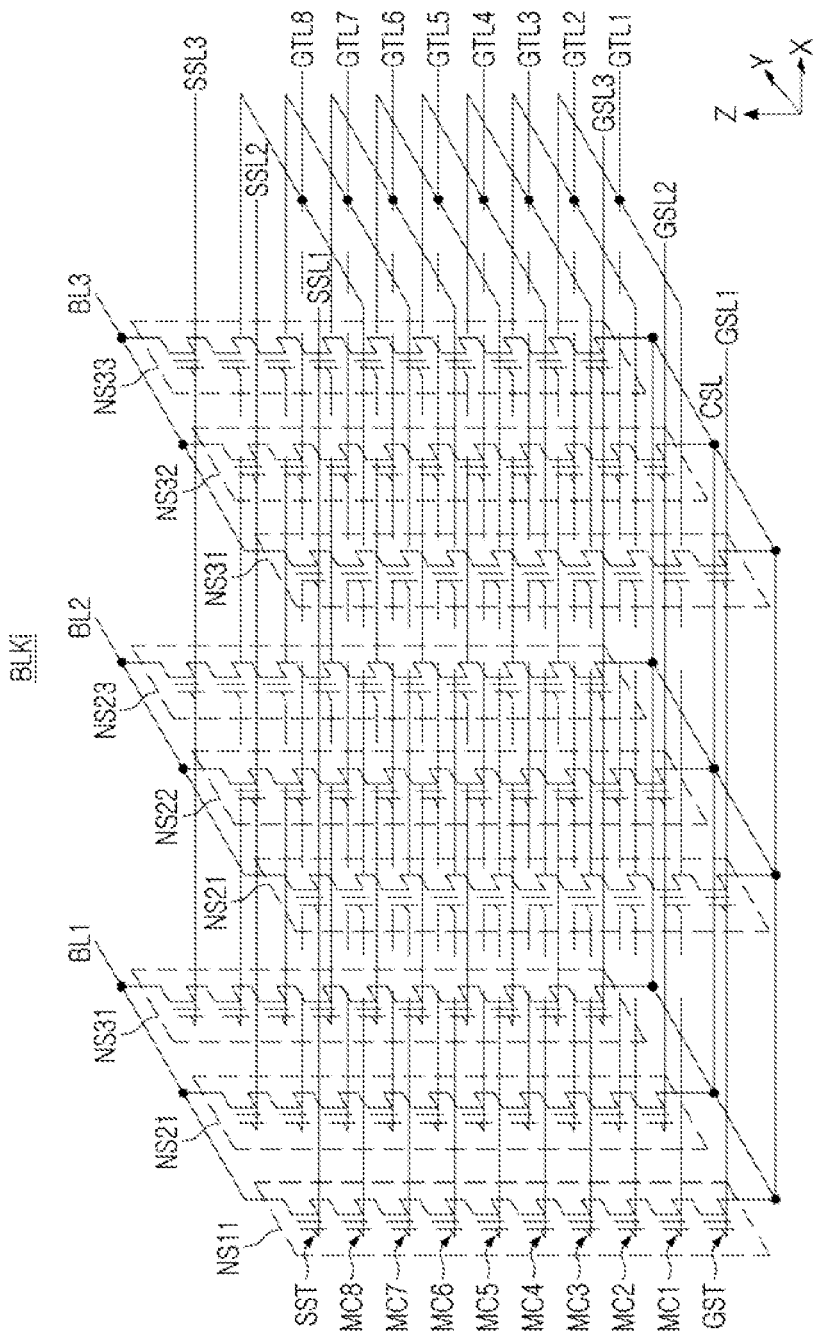
FIG. 18 is a diagram of a memory cell array according to an example embodiment.

FIG. 18 is a diagram of a memory cell array according to an example embodiment. FIG. 18 is a diagram for describing a 3D V-NAND structure that may be applied to a storage device according to an example embodiment. When the nonvolatile memory of the storage device is implemented as a 3D V-NAND type flash memory, each of a plurality of memory blocks constituting the nonvolatile memory may be represented by an equivalent circuit as illustrated in FIG. 18.

A memory block BLKi illustrated in FIG. 18 represents a three-dimensional memory block formed in a three-dimensional structure on a substrate. In an implementation, a plurality of memory NAND strings included in the memory block BLKi may be formed in a direction perpendicular to the substrate.

Referring to FIG. 18, the memory block BLKi may include a plurality of memory NAND strings NS11 to NS33 connected between bit lines BL1, BL2 and BL3 and a common source line CSL. Each of the plurality of memory NAND strings NS11 to NS33 may include a string selection transistor SST, a plurality of memory cells MC1, MC2, . . . , MC8, and a ground selection transistor GST. In FIG. 18, each of the plurality of memory NAND strings NS11 to NS33 includes eight memory cells MC1, MC2, . . . , and MC8.

The string selection transistor SST may be connected to corresponding string selection lines SSL1, SSL2, and SSL3. A plurality of memory cells MC1, MC2, . . . , and MC8 may be connected to corresponding gate lines GTL1, GTL2, . . . , and GTL8, respectively. The gate lines GTL1, GTL2, . . . , and GTL8 may correspond to the word lines, and a portion of the gate lines GTL1, GTL2, . . . , and GTL8 may correspond to dummy word lines. The ground selection transistor GST may be connected to corresponding ground selection lines GSL1, GSL2 and GSL3. The string selection transistor SST may be connected to corresponding bit lines BL1, BL2 and BL3, and the ground selection transistor GST may be connected to the common source line CSL.

Word lines (e.g., WL1) of the same height may be connected in common, and the ground selection lines GSL1, GSL2 and GSL3 and the string selection lines SSL1, SSL2 and SSL3 may be separated from each other. FIG. 18 illustrates that the memory block BLKi is connected to eight gate lines GTL1, GTL2, . . . , GTL8 and three bit lines BL1, BL2 and BL3.

By way of summation and review, a representative example of a flash memory-based high-capacity storage device is a solid-state drive (SSD). In such a storage device, the frequency of requesting specific data by various users or objects is increasing. When the data is loaded from a nonvolatile memory device such as a flash memory device, whenever specific data is requested, the response time may be reduced. In addition, the increase in the frequency of data requests may cause an increase in the amount of duplicate data storage, and may cause a decrease in storage space of the storage device.

An aspect of the present disclosure is to provide a storage device having an improved response time to a request by reducing the time for loading data having a large number of requests from a nonvolatile memory device. An aspect of the present disclosure is to provide a storage device for efficiently using a storage space by removing at least a portion of a large number of requested pieces of data from a nonvolatile memory device.

A storage device according to an example embodiment may create a machine learning model that can reproduce a portion of data having a large number of requests, and reduce the amount of data loaded from a nonvolatile memory device when the data is requested, by generating some data using the machine learning model. Accordingly, a time to load data having a large number of requests from the nonvolatile memory device may be reduced, and a response time to the request may be improved. A storage device according to an example embodiment may remove data that may be reproduced using the machine learning model from the nonvolatile memory device among data having a large number of requests. Accordingly, the storage space of the storage device may be efficiently used.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A storage device comprising:
a nonvolatile memory device; and
a storage controller configured to control the nonvolatile memory device,
wherein the storage controller is configured to:
detect a logical address pattern repeatedly requested by a host, divide the logical address pattern into input logical addresses and predictive logical addresses, and generate a reproduction model for generating reproduction data corresponding to the predictive logical addresses in a data pattern when the predictive logical addresses are input using machine learning, and
in response to a read request for the input logical addresses from the host, predict the predictive logical addresses using the input logical addresses, generate the reproduction data by inputting the predictive logical addresses into the reproduction model, and prefetch the generated reproduction data output from the reproduction model to a buffer memory included in the storage controller.

2. The storage device as claimed in claim 1, wherein the storage controller invalidates reproduction data corresponding to the predictive logical addresses in the nonvolatile memory device when the reproduction model is generated.

3. The storage device as claimed in claim 1, wherein the storage controller outputs the prefetched reproduction data to the host in response to a read request for the predictive logical addresses from the host.

4. The storage device as claimed in claim 1, wherein the storage controller updates a candidate logical address pattern list based on logical addresses received along with a read request from the host, and detects logical addresses in which a number of read requests exceeds a predetermined threshold value in the candidate logical address pattern list, by the repeatedly requested logical address pattern.

5. The storage device as claimed in claim 4, wherein when at least a predetermined number of logical addresses in an existing logical address pattern stored in the candidate logical address pattern list overlap the received logical addresses, the storage controller updates the existing logical address pattern with the overlapped logical addresses, and updates a number of read requests.

6. The storage device as claimed in claim 4, wherein the storage controller manages existing logical address patterns stored in the candidate logical address pattern list based on a caching technique.

7. The storage device as claimed in claim 1, wherein when the generation of the reproduction model is completed, the storage controller updates the logical address pattern in a learned logical address pattern list.

8. The storage device as claimed in claim 7, wherein the storage controller is configured to:
receive a write request and logical addresses from the host,
update data corresponding to the received logical addresses in response to the write request, and
remove the logical address pattern including the received logical addresses from the learned logical address pattern list when at least a portion of the received logical addresses overlaps a logical address pattern included in the learned logical address pattern list.

9. The storage device as claimed in claim 1, wherein the storage controller performs supervised learning using the predictive logical addresses and the reproduction data as learning data, and repeats the supervised learning until the same data as the reproduction data is output from the reproduction model when the predictive logical addresses are input to the reproduction model.

10. The storage device as claimed in claim 1, wherein the input logical addresses include continuous logical addresses in the logical address pattern, and the predictive logical addresses include logical addresses following the input logical addresses in the logical address pattern.

11. The storage device as claimed in claim 1, wherein the storage controller determines a size of the reproduction data included in the data pattern based on performance of a processor included in the storage controller, the processor executing the reproduction model.

12. The storage device as claimed in claim 1,
wherein the storage controller obtains data corresponding to the input logical addresses from the nonvolatile memory device in response to the read request, and
wherein the storage controller obtains the data corresponding to the input logical addresses simultaneously with generating the reproduction data.

13. The storage device as claimed in claim 1, wherein the storage controller performs the machine learning when the storage device is in an idle state.

14. A storage device comprising:
a nonvolatile memory device; and
a storage controller configured to control the nonvolatile memory device,
wherein the storage controller is configured to:
detect a data pattern repeatedly requested by a host, determine input data and reproduction data in the data pattern, generate a reproduction model for generating the reproduction data when the input data is input using machine learning, and store the input data in a learned data pattern list, and
in response to a read request for the input data from the host, obtain input data from the nonvolatile memory device, generate the reproduction data by inputting the obtained input data into the reproduction model, and prefetch the generated reproduction data output from the reproduction model to a buffer memory included in the storage controller.

15. The storage device as claimed in claim 14, wherein the storage controller receives logical addresses along with a read request from the host, and determines whether the read request is a read request for the input data by comparing the received logical addresses with logical addresses stored in a logical address pattern list.

16. The storage device as claimed in claim 15, wherein the storage controller is configured to:
when the received logical addresses are not included in the logical address pattern list, obtain data corresponding to the received logical addresses from the nonvolatile memory device,
when the obtained data includes the input data, generate the reproduction data by inputting the input data into the reproduction model,
determine whether the obtained data include the reproduction data,
when the obtained data further includes the reproduction data, divide the logical addresses into input logical addresses corresponding to the input data and predictive logical addresses corresponding to the reproduction data, and
update the input logical addresses and the predictive logical addresses in the logical address pattern list.

17. The storage device as claimed in claim 15, wherein the storage controller invalidates reproduction data corresponding to sa predictive logical addresses among data stored in the nonvolatile memory device.

18. The storage device as claimed in claim 14, wherein the storage controller is configured to;
further determine verification data in the data pattern, and further store the verification data in the learned data pattern list, and
when the obtained data includes the input data, obtain verification data from the nonvolatile memory device simultaneously with generating the reproduction data, verify whether the read request is a read request for the data pattern by comparing verification data stored in the learned data pattern list with the obtained verification data, and prefetch the generated reproduction data according to verification results.

19. A storage device comprising:
a nonvolatile memory device; and
a storage controller configured to control the nonvolatile memory device,
wherein the storage controller is configured to:
detect a data pattern repeatedly requested by a host, determine input data and reproduction data in the data pattern, and generate a reproduction model for generating the reproduction data when the input data is input using machine learning, and
obtain data corresponding to logical addresses from the nonvolatile memory device in response to a read request for the logical addresses from the host, generate the reproduction data by inputting the input data into the reproduction model when the obtained data includes the input data, divide the logical addresses into input logical addresses corresponding to the input data and predictive logical addresses corresponding to the reproduction data when the obtained data further includes the reproduction data, update the input logical addresses and the predictive logical addresses in a logical address pattern list, and invalidate reproduction data corresponding to the predictive logical addresses among data stored in the nonvolatile memory device.

20. The storage device as claimed in claim 19, wherein when the logical addresses received along with the read request from the host are included in the input logical addresses of the logical address pattern list, the storage controller obtains input data from the nonvolatile memory device based on the input logical addresses, obtains the reproduction data by inputting the input data into the reproduction model, and prefetches the obtained reproduction data to a buffer memory included in the storage controller.

* * * * *